US011019836B2

(12) United States Patent
Geistlinger et al.

(10) Patent No.: US 11,019,836 B2
(45) Date of Patent: Jun. 1, 2021

(54) FOOD PRODUCTS COMPRISING CELL WALL MATERIAL

(71) Applicant: Savage River, Inc., El Segundo, CA (US)

(72) Inventors: Timothy Geistlinger, Redondo Beach, CA (US); Michael S. Timmons, Los Angeles, CA (US)

(*) Notice: Subject to any disclaimer, the term of this patent is extended or adjusted under 35 U.S.C. 154(b) by 398 days.

(21) Appl. No.: 15/225,646

(22) Filed: Aug. 1, 2016

(65) Prior Publication Data
US 2017/0035076 A1 Feb. 9, 2017

Related U.S. Application Data

(60) Provisional application No. 62/200,489, filed on Aug. 3, 2015.

(51) Int. Cl.
| | |
|---|---|
| A23J 3/22 | (2006.01) |
| A23J 3/14 | (2006.01) |
| A23L 31/15 | (2016.01) |
| A23J 3/20 | (2006.01) |
| A23L 11/30 | (2016.01) |
| A23L 13/40 | (2016.01) |
| A23J 3/04 | (2006.01) |
| A23L 31/10 | (2016.01) |

(52) U.S. Cl.
CPC ............ *A23J 3/227* (2013.01); *A23J 3/04* (2013.01); *A23J 3/14* (2013.01); *A23L 11/30* (2016.08); *A23L 13/426* (2016.08); *A23L 13/428* (2016.08); *A23L 31/10* (2016.08); *A23L 31/15* (2016.08); *A23J 3/20* (2013.01)

(58) Field of Classification Search
CPC ...... A23J 3/227; A23J 3/14; A23J 3/20; A23L 13/246; A23L 13/248; A23L 31/10; A23L 31/15
USPC ........................................................ 426/89
See application file for complete search history.

(56) References Cited

U.S. PATENT DOCUMENTS

| | | |
|---|---|---|
| 3,117,006 A | 1/1964 | Wenger |
| 3,843,807 A | 10/1974 | Ridgway, Jr. |
| 3,845,222 A | 10/1974 | Tannenbaum |
| 4,017,646 A | 4/1977 | Hoer et al. |
| 4,118,164 A | 10/1978 | Wenger et al. |
| 4,600,311 A | 7/1986 | Mourrier et al. |
| 4,763,569 A | 8/1988 | Wenger et al. |
| 5,437,885 A | 8/1995 | Lusas et al. |
| 6,589,579 B2* | 7/2003 | Ganan-Calvo ....... A61K 9/1694 424/439 |
| 2005/0106286 A1 | 5/2005 | Ashie et al. |
| 2006/0141126 A1 | 6/2006 | Levin et al. |
| 2007/0269583 A1 | 11/2007 | McMindes et al. |
| 2008/0069926 A1 | 3/2008 | Mueller et al. |
| 2008/0075808 A1 | 3/2008 | Altemueller |
| 2008/0233244 A1* | 9/2008 | Swenson ................... A23J 3/16 426/72 |
| 2008/0254168 A1 | 10/2008 | Mueller et al. |
| 2008/0260913 A1 | 10/2008 | Orcutt et al. |
| 2008/0268112 A1 | 10/2008 | Rolan et al. |
| 2009/0208612 A1 | 8/2009 | Reiser et al. |
| 2009/0208633 A1 | 8/2009 | Kyed et al. |
| 2010/0166940 A1 | 7/2010 | McMindes et al. |
| 2010/0189864 A1 | 7/2010 | Marsland |
| 2010/0303990 A1 | 12/2010 | Brooks et al. |
| 2011/0152177 A1* | 6/2011 | Vecino ................. A23K 20/147 514/3.1 |
| 2012/0093994 A1 | 4/2012 | Hsieh et al. |
| 2014/0127363 A1 | 5/2014 | Giezen et al. |
| 2014/0193547 A1 | 7/2014 | Brown et al. |
| 2014/0220217 A1 | 8/2014 | Brown et al. |
| 2015/0305390 A1 | 10/2015 | Vrljic et al. |

FOREIGN PATENT DOCUMENTS

| | | | |
|---|---|---|---|
| CN | 101756313 A * | 6/2010 | |
| WO | 2006023518 | 2/2006 | |
| WO | 2008043076 | 10/2008 | |
| WO | WO-2009131467 A1 * | 10/2009 | ........... A23K 20/147 |
| WO | WO-2013054812 A1 * | 4/2013 | ............... A23L 2/62 |
| WO | 2014110532 | 7/2014 | |
| WO | 2014110539 | 7/2014 | |
| WO | 2014110540 | 7/2014 | |

OTHER PUBLICATIONS

Lipke et al., Cell Wall Architecture in Yeast:New Structure and New Challenges, Journal of Bacteriology,vol. 180, No. 15, Aug. 1998, p. 3735-3740. (Year: 1998).*
Currie et al., Silica in Plants: Biological, Biochemical and Chemical Studies, Annals of Botany 100: 1383-1389, 2007; Oxford university press. (Year: 2007).*
Yao, et al., A New Method for Characterizing Fiber Formation in Meat Analogs during High-moisture Extrusion, journal, Aug. 11, 2004, 303-307, 69, Journal of Food Science, United States.
Akdogan, et al., High Moisture Food Extrusion, journal, 1999, 195-207, 34, Int. Journal of Food Science and Tech., Albany, CA.
MacDonald, et al., Soy Protein Isolate Extruded with High Moisture Retains High Nutritional Quality, journal, Mar. 23, 2009, 3550-3555, 57, J. Agric. Food Chem., United States.
Lin, et al., Extrusion Process Parameters, Sensory Characteristics, and Structural Properties of a High Moisture Soy Protein Meat Analog, journal, 2002, 1066-1072, 67, Journal of Food Science, United States.
Lin, et al., Texture and Chemical Characteristics of Soy Protein Meat Analog Extruded at High Moisture, journal, 2000, 264-269, 65, Journal of Food Science, United States.

(Continued)

*Primary Examiner* — Jyoti Chawla
(74) *Attorney, Agent, or Firm* — David R. Conklin; Kirton McConkie

(57) ABSTRACT

Provided are food products having structures, textures, and other properties similar to those of animal meat, and that comprise substantial amounts of cell wall material. Also provided are methods and processes for producing such food products.

43 Claims, No Drawings

(56) References Cited

OTHER PUBLICATIONS

Liu, et al., Protein-Protein Interactions during High-Moisture Extrusion for Fibrous Meat Analogues and Comparison of Protein Solubility Methods Using Different Solvent Systems, journal, Mar. 18, 2008, 2681-2687, 56, J. Agric Food Chem., United States.

* cited by examiner

FOOD PRODUCTS COMPRISING CELL WALL MATERIAL

CROSS REFERENCE TO RELATED APPLICATIONS

This application claims priority from Provisional Application Ser. No. 62/200,489, filed on Aug. 3, 2015, which is hereby incorporated by reference in its entirety.

FIELD OF THE INVENTION

Provided are food products that have structures, textures, and other properties comparable to those of animal meat and that comprise substantial amounts of cell wall material. Also provided are cost-effective processes for the production of such food products.

BACKGROUND

The health and environmental benefits of vegetarian and vegan diets are broadly recognized. To meet the rising demand for vegetarian and vegan dietary products, food scientists have engaged in efforts to develop protein food products that are not derived from animals but provide similar eating experiences and nutritional benefits as animal meat. Such efforts have had limited success, however, and consumer satisfaction and acceptance rates of the new protein food products have been low.

One barrier for acceptance is that the new vegetarian/vegan protein food products do not have the widely enjoyed textural and sensory characteristics of animal meat products. At the microscopic level, animal meat consists of a complex three-dimensional network of protein fibers that provides cohesion and firmness and that traps polysaccharides, fats, flavors, and moisture. In contrast, many of the available high protein vegetarian/vegan food products have looser and less complex protein structures (i.e., no protein fibers or limited sets of protein fibers that are aligned in only one direction and within a single plane) that disassemble easily during chewing, requiring an unsatisfactory, diminutive bite force and chewing time, and imparting sensations of "mealiness", "rubberiness", "sponginess", and/or "sliminess". Without a three-dimensional matrix, the new protein food products also cannot trap moisture and flavor effectively.

The difficulty of generating animal meat-like vegetarian/vegan protein food products stems in part from the presence of compounds during the production process that have an inhibitory effect on protein fiber formation. Such compounds are typically contained in plant extracts or other ingredients and additives used in production, but their specific removal would greatly increase the cost of sourcing these ingredients and additives, and/or would negatively impact other essential properties of the protein food products. For example, although oils generally improve the mouth feel and taste of vegetarian/vegan protein food products, their presence during production of such products tends to inhibit protein fiber formation, leading to protein food products that don't have animal meat-like structures and textures.

There exists, therefore, an unmet need for cost-effective methods by which compounds can be sequestered during production of non-animal protein food products, and by which such compounds can be prevented from inhibiting protein fiber formation, as well as for compositions produced by such methods. There also exists a need for non-animal food products that comprise compounds that impart animal meal-like properties in a protected manner, or that comprise mechanisms by which such properties are imparted in controlled or timed manner.

SUMMARY OF THE INVENTION

One aspect of the present invention provides meat structured protein products that comprise at least about 0.01% by weight of cell wall material; protein fibers that are substantially aligned; a moisture content of at least about 30%; and at least about 5% by weight of a non-animal protein material. In some embodiments, the meat structured protein products comprise polysaccharides or other compounds found in cell walls of a fungus, plant, algae, or bacterium. In some embodiments, the non-animal protein materials comprise pea protein. In some embodiments, the meat structured protein products further comprise lipid and/or carbohydrate materials. In some embodiments, the cell wall materials comprise bound compounds that impart animal meat-like properties on the meat structured protein product in bound state or upon release. In some embodiments, release of the bound compounds from the cell wall materials occurs only under certain conditions and/or in a timed or controlled fashion.

Another aspect of the present invention provides processes for producing the meat structured protein products. The processes can comprise the steps of combining non-animal protein materials, water, and cell wall materials to form a dough; shearing and heating the dough so as to denature the proteins in the non-animal protein materials and to produce protein fibers that are substantially aligned; and setting the dough to fix the fibrous structure previously obtained.

Yet another aspect of the present invention provides extended meat products. In general, the extended meat products comprise animal meat products combined with the meat structured protein products provided herein.

DETAILED DESCRIPTION OF THE INVENTION

Unless defined otherwise, all technical and scientific terms used herein have the same meaning as is commonly understood by one of ordinary skill in the art to which this disclosure pertains.

Definitions

The term "animal meat" as used herein refers to flesh, whole meat muscle, or parts thereof, derived from an animal.

The term "animal protein" as used herein refers to protein whose amino acid sequence matches the amino acid sequence of protein found in an animal, including in a genetically modified animal. The animal protein can be derived from an animal (i.e., extracted from the animal, either in pure form or mixed with other components of the animal) or be otherwise obtained (e.g., extracted from a non-animal source, biosynthetically produced, or synthetically produced).

The term "algae" as used herein refers to single-celled and multi-celled eukaryotes and prokaryotes that have chlorophyll as their primary photosynthetic pigment and that lack a sterile covering of cells around their reproductive cells. The term as used herein includes cyanobacteria (blue-green algae).

The term "bacteria" as used herein refers to prokaryotic microorganisms.

The term "bound cell membrane" as used herein refers to cell membrane that is non-covalently bound to a cell wall or cell wall fragment, for example, via hydrogen bonding, ionic bonding, hydrophilic interaction, electrostatic interaction, ion exchange, metal ion chelation, coordination complex formation, or precipitation (e.g., involving hydroxyl, carboxyl, phosphate, sulfate, or amino groups).

The term "bound compound" as used herein refers to a compound that is not an integral part of a cell wall or cell wall fragment but that is non-covalently bound to a cell wall or cell wall fragment, for example, via hydrogen bonding, ionic bonding, hydrophilic interaction, electrostatic interaction, ion exchange, metal ion chelation, coordination complex formation, or precipitation (e.g., involving hydroxyl, carboxyl, phosphate, sulfate, or amino groups).

The term "cell wall" as used herein refers to the molecular structure that surrounds many biological cells and provides the cells with structural support and other vital functions. The composition of cell walls differs between cell types, but they frequently comprise polysaccharides and glycoproteins.

The term "cell wall fragment" as used herein refers to cell walls that are not intact but that are broken into fragments.

The term "cell wall material" as used herein refers to cell walls and cell wall fragments, and extends to cell walls and cell wall fragments with bound cell membrane and/or bound compounds. Cell wall material is also known in the art under the terms ghosts, hulls, husks, shells, envelopes, debris, refuse, or "ref".

The term "controlled conditions" as used herein refers to conditions that are defined by a human. Examples of conditions that can be defined by a human include but are not limited to the level of oxygenation, pH, salt concentration, temperature, and nutrient (e.g., carbon, nitrogen, sulfur) availability. A natural source grown under "controlled conditions" may produce a distribution of proteins, carbohydrates, lipids, and compounds that is not native to the natural source.

The term "dough" as used herein refers to a blend of dry ingredients ("dry mix"; e.g., proteins, carbohydrates, and lipids including liquid oils) and liquid ingredients ("liquid mix"; e.g., water or juice, and all other ingredients added with water or juice) from which a meat structured protein product as provided herein is produced through the application of mechanical energy (e.g., spinning, agitating, shaking, shearing, pressure, turbulence, impingement, confluence, beating, friction, wave), radiation energy (e.g., microwave, electromagnetic), thermal energy (e.g., heating, steam texturizing), enzymatic activity (e.g., transglutaminase activity), chemical reagents (e.g., pH adjusting agents, kosmotropic salts, chaotropic salts, gypsum, surfactants, emulsifiers, fatty acids, amino acids), other methods that lead to protein denaturation and protein fiber alignment, or combinations of these methods, followed by fixation of the fibrous structure (e.g., by rapid temperature and/or pressure change, rapid dehydration, chemical fixation, redox).

The terms "extending", and its passive "extended", as used herein refer to improving the nutritional content, moisture content, or another property of a food product.

The term "extended meat product" as used herein refers to an animal meat that is extended with a meat structured protein product provided herein.

The term "fungus" as used herein refers to a member of the kingdom of fungi.

The term "hydrated protein fibrous product" as used herein refers to the product obtained after a protein fibrous product has absorbed water (i.e., is hydrated or marinated).

The term "meat structured protein product" as used herein refers to a food product that is not derived from an animal but has structure, texture, color, and/or other properties comparable to those of animal meat. The term refers to protein fibrous product, hydrated protein fibrous product, and/or other post-processed protein fibrous products unless otherwise indicated herein or clearly contradicted by context.

The term "microbe" as used herein is an abbreviation for microorganism, and refers to a unicellular organism. As used herein, the term includes all bacteria, all archae, unicellular protista, unicellular animals, unicellular plants, unicellular fungi, unicellular algae, all protozoa, and all chromista.

The term "modified natural source" as used herein refers to a natural source that is altered from its native state (e.g., mutated, genetically engineered).

The term "moisture content" and its acronym "MC" as used herein refer to the amount of moisture in a material as measured in an analytical method calculated as percentage change in mass following the evaporation of water from a sample.

The term "mouth feel" as used herein refers to the overall appeal of a food product, which stems from the combination of characteristics such as aroma, moistness, chewiness, bite force, degradation, and fattiness that together provide a satisfactory sensory experience.

The term "native" as used herein refers to what is natural (i.e., found in nature). For example, a protein that is native to a natural source is naturally produced by the natural source when the natural source is not intentionally modified by a human.

The term "natural" or "naturally occurring" as used herein refers to what is found in nature.

The term "natural source" as used herein refers to a naturally occurring plant, algae, fungus, or microbe.

The terms "optional" or "optionally" mean that the feature or structure may or may not be present, or that an event or circumstance may or may not occur, and that the description includes instances where a particular feature or structure is present and instances where the feature or structure is absent, or instances where the event or circumstance occurs and instances where the event or circumstance does not occur.

The term "pea flour" as used herein refers to a comminuted form of defatted pea material, preferably containing less than about 1% oil, formed of particles having a size such that the particles can pass through a No. 100 mesh (U.S. Standard) screen. It typically has at least 20% protein on a dry-weight basis.

The term "pea protein" as used herein refers to protein present in pea.

The term "pea protein concentrate" as used herein refers to the protein material that is obtained from pea upon removal of soluble carbohydrate, ash, and other minor constituents. It has at least 40% protein on a dry-weight basis.

The term "pea protein isolate" as used herein refers to the protein material that is obtained from pea upon removal of insoluble polysaccharide, soluble carbohydrate, ash, and other minor constituents. It typically has at least 80% protein on a dry-weight basis.

The term "pea starch" as used herein refers to starch present in pea.

The term "post-processed protein fibrous product" as used herein refers to the food product that is obtained after a protein fibrous product has undergone post-processing. The term encompasses hydrated protein fibrous product.

The term "post-processing" as used herein refers to processing the protein fibrous product undergoes after its fibrous structure is generated and fixed, including but not limited to hydration, marination, and drying.

The term "protein" as used herein refers to a polymeric form of amino acids of any length, which can include coded and non-coded amino acids, chemically or biochemically modified or derivatized amino acids, and polypeptides having modified peptide backbones.

The term "protein fiber" as used herein refers to a continuous filament of discrete length made up of protein held together by intermolecular forces such as disulfide bonds, hydrogen bonds, electrostatic bonds, hydrophobic interactions, peptide strand entanglement, and Maillard reaction chemistry creating covalent cross-links between side chains of proteins.

The term "protein fibrous product" as used herein refers to the product obtained from a dough after application of mechanical energy (e.g., spinning, agitating, shaking, shearing, pressure, turbulence, impingement, confluence, beating, friction, wave), radiation energy (e.g., microwave, electromagnetic), thermal energy (e.g., heating, steam texturizing), enzymatic activity (e.g., transglutaminase activity), chemical reagents (e.g., pH adjusting agents, kosmotropic salts, chaotropic salts, gypsum, surfactants, emulsifiers, fatty acids, amino acids), other methods that lead to protein denaturation and protein fiber alignment, or combinations of these methods, followed by fixation of the fibrous structure (e.g., by rapid temperature and/or pressure change, rapid dehydration, chemical fixation, redox).

The term "substantially aligned" as used herein refers to an arrangement of protein fibers such that a significantly high percentage of the fibers are contiguous to each other at less than about a 45° angle when viewed in a horizontal plane.

The term "Warner-Bratzler shear strength" and its acronym "WBS strength" as used herein refer to the maximum force needed to mechanically shear through a sample using a 3.2 mm blade that is run at a speed of 5 mm/sec. A method for measuring WBS is disclosed in U.S. Utility application Ser. No. 14/687,803 filed on Apr. 15, 2015, which is hereby incorporated by reference in its entirety. The WBS strength is an established measure of meat tenderness.

The term "yeast cell wall material" as used herein refers to cell wall material derived from yeast.

The terms "a" and "an" and "the" and similar referents as used herein refer to both the singular and the plural, unless otherwise indicated herein or clearly contradicted by context.

The term "about" as used herein refers to greater or lesser than the value or range of values stated by 1/10 of the stated values, but is not intended to limit any value or range of values to only this broader definition. For instance, a value of "about 30%" means a value of between 27% and 33%. Each value or range of values preceded by the term "about" is also intended to encompass the embodiment of the stated absolute value or range of values.

Recitation of ranges of values herein are merely intended to serve as a shorthand method of referring individually to each separate value inclusively falling within the range, unless otherwise indicated herein, and each separate value is incorporated into the specification as if it were individually recited herein.

Meat Structured Protein Products Comprising Cell Wall Material

In one aspect, provided herein are meat structured protein products that comprise substantial amounts of cell wall material.

The meat structured protein products provided herein have several advantages. For one, cell wall material can bind and sequester compounds that are detrimental to the formation of protein fiber networks or that negatively impact other animal meat-like properties of the meat structured protein products (e.g., taste, odor, color, stability, nutritional content). Conversely, cell wall material can encapsulate or bind ingredients that improve animal meat-like properties of the meat structured protein products (e.g, taste, odor, color, stability), and protect such ingredients from conditions that would otherwise remove such favorable effects (e.g., UV irradiation, heating, oxidation, high or low pH). Encapsulation by or binding to cell wall material can also enable a timed or controlled release of ingredients during production (e.g., extrusion), preparation (e.g., heating), consumption (e.g., chewing), or storage (e.g., freezing) of the meat structured protein products. Moreover, once encapsulated by or bound to cell wall material, poorly water soluble materials can be dispersed more readily in aqueous systems without the aid of solvents or surfactants, liquids can be converted to solids for improved handling and safety, reactions between ingredients during production or in the final products can be suppressed, and evaporation of volatile materials (e.g., volatile flavoring agents) during production or storage can be minimized. Lastly, cell wall material itself can comprise compounds that increase the nutritional content of the meat structured protein products (e.g., fiber, sterols, long chain unsaturated fatty acids, vitamins, essential oils), or can act as thickening agents, marbelizing agents, gelling agents, coating agents, binders, or gums.

The meat structured protein products provided herein comprise at least about 0.01% by weight of cell wall material. The cell wall material may be derived from a single natural or modified natural source or from multiple natural or modified natural sources. In some embodiments, the meat structured protein products comprise between about 0.01% and about 10%, between about 0.1% and about 7%, between about 0.1% and about 5%, between about 1% and about 10%, between about 1% and about 7%, between about 1% and about 5%, between about 0.01% and about 0.1%, between about 0.1% and about 1%, between about 0.5% and about 1.5%, between about 1% and about 2%, between about 5% and about 10%, between about 7% and about 10%, between about 5% and about 7%, between about 0.01% and about 7%, between about 0.1% and about 3%, between about 1% and about 3%, or between about 3% and about 7% by weight of cell wall material. In some embodiments, the meat structured protein products comprise at least about 0.1% by weight of yeast cell wall material. A method for determining the cell wall material content of a meat structured protein product is provided in Example 2.

In some embodiments, the meat structured protein products provided herein comprise at least about 0.001% by weight of a polysaccharide found in cell walls. The polysaccharide may be comprised of identical polysaccharide molecules or of a mixture of polysaccharide molecules having at least 2 different primary structures. The polysaccharide may be derived from any one natural or modified natural source. In some embodiments, the polysaccharide is native to the natural or modified natural source from which the cell wall material is derived. In some such embodiments, the polysaccharide is produced when the natural or modified natural source is grown under controlled conditions (e.g., aerobic conditions, anaerobic conditions, pH changes, salt conditions, temperature changes, nutrient [e.g., carbon, nitrogen, sulfur] limitations). In other embodiments, the polysaccharide is not native to the natural source from which the cell wall material is derived. In some embodiments, the polysaccharide is not derived from a natural or modified natural source but is identical or similar to polysaccharide found in a natural or modified natural source, for example, the polysaccharide is synthetically or biosynthetically generated but comprises polysaccharide molecules that have an identical or similar primary structure as polysaccharide molecules found in a natural or modified natural source. In some embodiments, the meat structured protein products comprise between about 0.002% and about 1%, between about 0.01% and about 0.7%, between about 0.01% and about 0.5%, between about 0.1% and about 1%, between about 0.1% and about 0.7%, between about 0.1% and about 0.5%, between about 0.002% and about 0.01%, between about 0.01% and about 0.1%, between about 0.05% and about 0.15%, between about 0.1% and about 0.2%, between about 0.5% and about 1%, between about 0.7% and about 1%, or between about 0.5% and about 0.7% by weight of a polysaccharide found in cell walls. In some embodiments, the meat structured protein products comprise at least about 0.01% by weight of a polysaccharide found in the cell wall of a yeast. In preferred embodiments, the meat structured protein products provided herein comprise at least about 0.1% by weight of a polysaccharide found in the cell wall of a yeast.

In some embodiments, the polysaccharide is native to a plant. In some such embodiments, the polysaccharide is selected from the group consisting of cellulose, xyloglucan, and pectin. In other embodiments, the polysaccharide is native to an algae. In some such embodiments, the polysaccharide is selected from the group consisting of cellulose, mannans, xylans, alginic acid, sulfonate polysaccharides, agarose, carrageenan, porphyran, furcellaran, and funoran. In yet other embodiments, the polysaccharide is native to a fungus. In some such embodiments, the polysaccharide is selected from the group consisting of mannan, chitin, alpha-glucans, and beta-glucans. Methods for determining the content of chitin or beta-glucans are known in the art (see, for example, Danielson et al. Enzymatic method to measure beta-1,3-beta-1,6-glucan content in extracts and formulated products (GEM assay). J Agric. Food Chem. 2010. 58: 10305-10308.; Molleken et al. A new colorimetric method to quantify beta-1,3-1,6-glucans in comparison with total beta-1,3-glucans and a method to quantify chitin in edible mushrooms. Proceedings of the 7th International Conference on Mushroom Biology and Mushroom Products (ICMBMP7) (2011) 263-273; Nitschke et al. A new colorimetric method to quantify beta-1,3-1.6-glucans in comparison with total beta-1,3-glucans in edible mushrooms. Food Chemistry (2011) 127: 791-796; Schiavone et al. A combined chemical and enzymatic method to determine quantitatively the polysaccharide components in the cell wall of yeasts. FEMS Yeast Res 14. 2014. 933-947.). In yet other embodiments, the polysaccharide is native to a bacterium. In some such embodiments, the polysaccharide is bacterial murein.

In some embodiments, the meat structured protein products provided herein comprise at least about 0.001% by weight of another compound found in cell walls. In some embodiments, such compound is a glycoprotein. In other embodiments, such compound is orthosilicic acid.

In some embodiments, the meat structured protein products provided herein comprise a polysaccharide found in the cell wall of a natural or modified natural source and a protein found in the natural or modified natural source but not found in the cell wall of the natural or modified natural source at a ratio that is higher than the ratio found in the natural or modified natural source. Suitable polysaccharides found in the cell wall of yeast include but are not limited to mannan, chitin, alpha-glucans, and beta-glucans. Suitable proteins not found in cell walls of yeast include but are not limited to actin (ACT1, ABY1, END7), actin-related protein 2 (ARP2, ACT2), actin-related protein 1 (ARP1, ACT5), F-actin-capping protein subunit beta (CAP2), actin-related protein 3 (ARP3, ACT4), alcohol dehydrogenase, alkaline phosphatase, carboxypeptidase Y, cytochrome oxidase subunit III, cytosine deaminase, dolichol phosphate mannose synthase, hexokinase, homocitrate synthase (Lys20, Lys21), 3-phosphoglycerate kinase, protein disulfide isomerase, fibrillarin (Nop1), and ergosterol. A method for measuring, for example, ergosterol is known in the art (see, for example, Ng et al. Estimation of fungal growth using the ergosterol assay: a rapid tool in assessing the microbiological status of grains and feeds. Letters in Applied Microbiology. 2008. 46: 113-118.). Methods for measuring the presence of peptides, using, for example, monoclonal or polyclonal antibodies (commercially available from, e.g., Abcam, Cambridge, Mass.; Life Technologies, Grand Island, N.Y.; Santa Cruz Biotechnology, Dallas, Tex.) in ELISA or Western blotting methods, are also known in the art. Methods for assaying for the absence of whole and live cells, using, for example, PCR methods, are also known in the art. For example, the rDNA PCR-RFLP method can be used for the amplification of rDNA repeats such as the ITS1 or ITS2 spacers embedded in the 5.8S or 26S rRNA genes of yeast; the mtDNA PCR-RFLP method can be used for the amplification and detection of strain specific mitochondrial DNA polymorphisms. PCR primers targeted to Ty1 retrotransposon delta sequences can be used to detect yeast DNA and differentiate between strains; hypervariable yeast microsatellite sequences can be targeted by PCR and used both to detect and type various yeast DNAs; the PCR-DGGE method can be used to amplify yeast 26S rDNA, and microbial identification can be done by sequencing the isolated PCR fragments; and real time PCR can be targeted to the intron sequences of yeast actin genes and used for species identification. There are also commercially available products that can be used for yeast detection by PCR and/or fingerprinting, such as, for example, the *Saccharomyces cerevisiae* PCR Detection Kit (Norgen Biotek Corporation, Thorolt, Canada; detects a region of the yeast genome), the BAX® System Q7 (Dupont, Hayward, Calif.; detects pan-fungal rRNA), the foodproof® Yeast and Mold Quantification Lyokit (Biotecon Diagnostics, Potsdam, Germany), the DiversiLab fragment based genotype method (Biomérieux, Durham, N.C.; detects and fingerprints repetitive fungal sequences).

In some embodiments, the meat structured protein products provided herein comprise cell wall material comprising bound compounds. In some such embodiments, the bound compounds are produced by the natural or modified natural source from which the cell wall material is derived and are extracted in bound state with the cell wall material. In other such embodiments, the bound compounds are bound to the cell wall material after extraction of the cell wall material, for example during a post-extraction incubation of the cell wall material with the compounds.

In some embodiments, the compounds impart favorable characteristics on the meat structured protein products. In some embodiments, such favorable characteristics are imparted when the compounds are bound to the cell wall material. In some such embodiments, binding of the compounds to the cell wall material protects them from conditions during production of the meat structured protein products (e.g., protects volatile compounds such as aroma or flavoring agents from evaporation under high temperature conditions). In some embodiments, such favorable characteristics are imparted upon release of the compounds from the cell wall material. In some such latter embodiments, such release only occurs under certain trigger conditions.

Examples of bound compounds include but are not limited to flavoring agents, coloring agents, pigments, binding agents, volatile compounds, salts, fats, lipids, oils (e.g., coco-nut oil, palm oil), gums, natural or synthetic polymers, starches, pectins, tannins, vitamins, thermolabile compounds, redox intolerant compounds, acid/base intolerant agents, buffers, pH adjusting agents, micronutrients, essential nutrients, stabilizing agents, crosslinking agents, hygroscopic agents, surfactants, diatomaceous earth, plant extracts, microbial extracts, anti-bacterials, anti-fungals, and textural agents.

Examples of favorable characteristics the bound compounds can impart include but are not limited to flavor, color, color transition during cooking, odor, mouthfeel, texture (e.g., chewiness, resilience, adhesiveness, hardness, WBS strength, juiciness), structure, nutritional value, freshness, sizzle sound during cooking, melted fat release during cooking, shelf life, digestibility, moisture, enzymatic activity, and nutrient stability.

Examples of trigger conditions under which the bound compounds can be released from the cell wall material include but are not limited to temperature, oxygenation, UV irradiation, pH, salt concentration, nutrient concentration, passage of time, mechanical force, pressure, and sound energy. For example, the cell wall material may bind flavoring agents that are released during biting or cooking; or coloring agents that are released during cooking; or crosslinking agents that are released at a specific pH, during cooking, at a specific time, or during aging; or pH adjusting agents that are released during freezing and that stabilize the color of the meat structured protein product.

In some embodiments, the bound compounds impart or enhance meat-like attributes at specific stages of cooking (e.g., after addition of specific amounts of thermal energy). In some such embodiments, the bound compounds are precursor molecules that can react with other precursor molecules or other ingredients of the food products to effect color change, aroma release, taste production, melted fat release, sizzle sound, and other effects consumers associate with the cooking of animal meat at specific points during the cooking process and at specific locations within the food products. In some embodiments, trigger conditions are elevated temperatures, and the bound compounds impart or enhance the impression of meat-like stages of doneness. Without wishing to be bound by theory, thermal energy addition decreases from the surface to the middle of cooking food products, such that cell wall materials that release their agents at specific elevated temperatures will first do so on the surface of a cooking food product and require longer or hotter cooking to do so in the middle of the food product.

In some embodiments, the cell wall material is further encapsulated in lipid to slow the release of the bound compound.

The meat structured protein products provided herein comprise at least about 5% by weight of protein. The protein may be comprised of polypeptide molecules having an identical amino acid sequence, or of a mixture of polypeptide molecules having at least 2 different amino acid sequences. The protein may be derived from any one natural or modified natural source or from multiple natural or modified natural sources. In some embodiments, the protein is not derived from a natural or modified natural source but is identical or similar to protein found in a natural or modified natural source, for example, the protein is synthetically or biosynthetically generated but comprises polypeptide molecules that have an identical or similar amino acid sequence as polypeptide molecules found in a natural source. In some embodiments, the meat structured protein products comprise between about 5% and about 70%, between about 20% and about 60%, between about 30% and about 50%, between about 34% and about 50%, between about 30% and about 60%, between about 40% and about 70%, between about 40% and about 60%, between about 5% and about 35%, between about 10% and about 30%, between about 15% and about 25%, between about 17% and about 25%, between about 15% and about 30%, between about 20% and about 35%, or between about 20% and about 30% by weight of protein. Protein content of a food product can be determined by a variety of methods, including but not limited to AOAC International reference methods AOAC 990.03 and AOAC 992.15. In some embodiments, at least some of the protein is derived from plant. In some embodiments, the meat structured protein products comprise pea protein. The pea protein may be derived from whole pea or from a component of pea in accordance with methods generally known in the art. The pea may be standard pea (i.e., non-genetically modified pea), commoditized pea, genetically modified pea, or combinations thereof. In some embodiments, the meat structured protein products provided herein comprise between about 10% and about 70%, between about 20% and about 60%, between about 30% and about 50%, between about 40% and about 60%, between about 34% and about 46%, between about 5% and about 35%, between about 10% and about 30%, between about 15% and about 25%, between about 11% and about 23%, or between about 20% and about 30% by weight of *Pisum sativum* protein. In some embodiments, the meat structured protein products comprise only non-purified protein. In other embodiments, the meat structured protein products comprise at least some partially purified protein. In yet other embodiments, the meat structured protein products comprise at least some purified protein. In some embodiments, the meat structured protein products comprise less than about 40%, less than about 30%, less than about 20%, less than about 10%, or less than about 6% by weight of a single protein species. In some embodiments, the most abundant protein species comprised in the meat structured protein products is legumin. In some such embodiments, the meat structured protein products comprise no more than about 5%, about 7.5%, or about 10% by weight of legumin.

The meat structured protein products provided herein can optionally comprise lipid. Without being bound by theory, it is believed that lipid may prevent the sensation of drying during chewing. Examples of suitable lipids include but are not limited to docosahexaenoic acid, eicosapentaenoic acid, conjugated fatty acids, eicosanoids, palmitic acid, glycolipids (e.g., cerebrosides, galactolipids, glycosphingolipids, lipopolysaccharides, gangliosides), membrane lipids (e.g., ceramides, sphingomyelin, bactoprenol), glycerides, second messenger signaling lipid (e.g., diglyceride), triglycerides, prenol lipids, prostaglandins, saccharolipids, oils (e.g., non-essential oils, essential oils, almond oil, aloe vera oil, apricot kernel oil, avocado oil, baobab oil, calendula oil, canola oil, corn oil, cottonseed oil, evening primrose oil, grape oil, grape seed oil, hazelnut oil, jojoba oil, linseed oil, macadamia oil, natural oils, neem oil, non-hydrogenated oils, olive oil, palm oil, partially hydrogenated oils, peanut oil, rapeseed oil, sesame oil, soybean oil, sunflower oil, synthetic oils, vegetable oil), omega-fatty acids (e.g., arachidonic acid, omega-3-fatty acids, omega-6-fatty acids, omega-7-fatty acids, omega-9-fatty acids), and phospholipids (e.g., cardiolipin, ceramide phosphocholines, ceramide phosphoethanolamines, glycerophospholipids, phosphatidicacid, phosphatidylcholine, phosphatidylethanolamine, phosphatidylinositol, phosphosphingolipids, phosphatidylserine). The lipid may be derived from any one natural or modified natural source or from multiple natural or modified natural sources. In some embodiments, the lipid is not derived from a natural or modified natural source but is identical or similar to lipid found in a natural or modified natural source, for example, the lipid is synthetically or biosynthetically generated but is identical or similar to lipid found in a natural source. In some embodiments, at least some of the lipid is derived from plant. In some embodiments, the meat structured protein products provided herein comprise between about 0.5% and about 10%, between about 2% and about 8%, between about 2% and about 6%, between about 2% and about 5%, between about 2% and about 4%, between about 3% and about 6%, between about 3% and about 5%, between about 3% and about 4%, between about 4% and about 5%, between about 5% and about 10%, between about 0.5% and about 5%, between about 1% and about 4%, between about 1% and about 3%, between about 1% and about 2%, between about 1.5% and about 3%, between about 1.5% and about 2.5%, between about 1.5% and about 2%, between about 2% and about 2.5%, between about 2.5% and about 5% by weight of lipid. In some embodiments, the meat structured protein products comprise less than about 7%, less than about 6%, less than about 5%, less than about 4%, less than about 3%, less than about 2%, less than about 1%, less than about 0.5%, less than about 0.25%, less than about 0.1%, or less than about 0.005% by weight of saturated fat. In some embodiments, the meat structured protein products comprise no cholesterol. In some embodiments, the meat structured protein products comprise at least about 2%, between about 2% and about 10%, between about 3% and about 9%, between about 4% and about 8%, between about 5% and about 7% by weight of mono-unsaturated lipids. In some embodiments, the meat structured protein products comprise at least about 5%, between about 5% and about 30%, between about 10% and about 25%, between about 15% and about 20%, or between about 10% and about 15%, by weight of poly-unsaturated lipids. Lipid content of a food product can be determined by a variety of methods, including but not limited to AOAC International reference method AOAC 954.02. In some embodiments, the meat structured protein products comprise less than about 2%, less than about 1%, less than about 0.5%, less than about 0.25%, less than about 0.1%, or less than about 0.005% by weight of saturated fat.

The meat structured protein products provided herein can optionally comprise carbohydrate. A variety of ingredients may be used as all or part of the carbohydrate, including but not limited to starch, flour, edible fiber, and combinations thereof. Examples of suitable starches include but are not limited to maltodextrin, inulin, fructooligosaccharides, pectin, carboxymethyl cellulose, guar gum, corn starch, oat starch, potato starch, rice starch, pea starch, and wheat starch. Examples of suitable flour include but are not limited to amaranth flour, oat flour, quinoa flour, rice flour, rye flour, sorghum flour, soy flour, wheat flour, and corn flour. Examples of suitable edible fiber include but are not limited to barley bran, carrot fiber, citrus fiber, corn bran, soluble dietary fiber, insoluble dietary fiber, oat bran, pea fiber, rice bran, head husks, soy fiber, soy polysaccharide, wheat bran, and wood pulp cellulose. The carbohydrate may be derived from any one natural or modified natural source or from multiple natural or modified natural sources. In some embodiments, the carbohydrate is not derived from a natural or modified natural source but is identical or similar to carbohydrate found in a natural source, for example, the carbohydrate is synthetically or biosynthetically generated but comprises molecules that have an identical or similar primary structure as molecules found in a natural source. In some embodiments, the meat structured protein products provided herein comprise between about 0.1% and about 20%, between about 1% and about 10%, between about 2% and about 9%, between about 1% and about 5%, between about 2% and about 4%, between about 1% and about 3%, between about 5% and about 15%, between about 0.5% and about 10%, between about 0.5% and about 5%, between about 0.5% and about 2.5%, between about 0.5% and about 1.5%, between about 1% and about 3%, or between about 2.5% and about 7.5% by weight of carbohydrate. In some embodiments, the meat structured protein products comprise between about 0.2% to about 3%, between about 1% and about 3%, between about 2% and about 3%, between about 0.1% to about 1.5%, or between about 1% and about 1.5% by weight of starch. In some embodiments, the meat structured protein products comprise pea starch. In some such embodiments, the meat structured protein products provided herein comprise between about 0.2% and about 3%, between about 1% and about 3%, between about 2% and about 3%, between about 0.1% and about 1.5%, between about 0.5% and about 1.5%, or between about 1% and about 1.5% by weight of *Pisum sativum* starch. In some embodiments, the meat structured protein products comprise between about 0.1% and about 5%, between about 0.1% and about 3%, between about 0.1% and about 2%, between about 0.1% and about 1%, between about 0.4% and about 0.6%, between about 0.05% and about 2.5%, between about 0.05% and about 1.5%, between about 0.05% and about 1%, or between about 0.0.5% and about 0.5% by weight of edible fiber. In some embodiments, the meat structured protein products comprise edible pea fiber. In some such embodiments, the meat structured protein products comprise between 0.1% and about 5%, between about 0.1% and about 3%, between about 0.1% and about 2%, between about 0.1% and about 1%, between about 0.4% and about 0.6%, between about 0.05% and about 2.5%, between about 0.05% and about 1.5%, between about 0.05% and about 1%, or between about 0.0.5% and about 0.5% by weight of *Pisum sativum* edible fiber.

The meat structured protein products provided herein comprise a moisture content (MC) of at least about 30%. A method for determining MC is disclosed in Utility application Ser. No. 14/687,803 filed on Apr. 15, 2015. Without being bound by theory, it is believed that a high MC may prevent the sensation of drying during chewing. In some embodiments, the meat structured protein products provided herein comprise a MC of between about 30% and about 90%, between about 30% and about 80%, between about 30% and about 70%, between about 30% and about 60%, between about 40% and about 60%, between about 33% and about 45%, between about 40% and about 50% between about 30% and about 60%, between about 50% and about 70%, between about 55% and about 65%, between about 50% and about 90%, between about 60% and about 80%, between about 50% and about 70%, between about 70% and about 80%, between about 75% and about 85%, or between about 65% and about 90% by weight.

It is also within the scope of the invention that the meat structured protein products provided herein comprise small amounts (i.e., 2% or less by weight) of protein, carbohydrate, lipid, or other ingredients derived from animal (e.g., albumin or collagen).

The meat structured protein products provided herein have a microscopic protein structure similar to that of animal meat. Specifically, the meat structured protein products are made up of protein fibers that are substantially aligned and that form a three-dimensional protein network. Methods for determining the degree of protein fiber alignment and three-dimensional protein network are known in the art and include visual determination based upon photographs and micrographic images, as disclosed in U.S. Utility application Ser. No. 14/687,803 filed on Apr. 15, 2015. Without being bound by theory, it is believed that the microscopic protein structures of the meat structured protein products provided herein impart physical, textural, and sensory properties that are similar to those of cooked animal meat, wherein the aligned and interconnected protein fibers may impart cohesion and firmness, and the open spaces in the protein network may weaken the integrity of the fibrous structures and tenderize the meat structured protein products while also providing pockets for capturing water, carbohydrates, salts, lipids, flavorings, and other materials that are slowly released during chewing to lubricate the shearing process and to impart other meat-like sensory characteristics. In some embodiments, in the meat structured protein products provided herein at least about 55%, at least about 65%, at least about 75%, at least about 85%, or at least about 95% of the protein fibers are substantially aligned.

In some embodiments, the meat structured protein products have a density of between about 0.3 and about 0.5, between about 0.3 and about 0.45, between about 0.35 and about 0.4. Methods for determining density are disclosed in U.S. Provisional Applications Ser. No. 62/250,161 filed on Nov. 3, 2015 and Ser. No. 62/339,765 Filed on May 20, 2016.

In some embodiments, the meat structured protein products have a fold-volume-change-after-hydration of between about 1.8 and about 3, between about 2 and about 2.7, between about 2.1 and about 2.6, between about 2.3 and about 2.5, or between about 2.5 and about 3. Methods for determining fold-volume-change-after-hydration are disclosed in U.S. Provisional Applications Ser. No. 62/250,161 filed on Nov. 3, 2015 and Ser. No. 62/339,765 Filed on May 20, 2016.

In some embodiments, the meat structured protein products have a color difference, deltaE, of between about 3.5 and about 4.5. Methods for colorimetric analyses are disclosed in U.S. Provisional Applications Ser. No. 62/250,161 filed on Nov. 3, 2015 and Ser. No. 62/339,765 Filed on May 20, 2016.

The meat structured protein products provided herein have eating qualities and mouth feels that are substantially similar to those of cooked animal meat. For example, meat structured protein products can have similar moisture, hardness/firmness, and overall texture compared to cooked 80/20 ground beef. The eating qualities and mouth feels of a meat structured protein product can be determined using a panel of human sensory experts.

In some embodiments, the meat structured protein products provided herein are gluten-free. In some embodiments, the meat structured protein products comprise no added artificial cross-linking agent that could facilitate filament formation, including but not limited to glucomannan, beta-1,3-glucan, transglutaminase, calcium salts, and magnesium salts. In some embodiments, the meat structured protein products are vegan. In some embodiments, the meat structured protein products comprise no GMO ingredients. In some embodiments, the meat structured protein products comprise no ingredients derived from nuts. In some embodiments, the meat structured protein products comprise less than about 0.6%, less than about 0.5%, between about 0.025% and about 0.6%, between about 0.25% and about 0.5%, between about 0.025% and about 0.4%, between about 0.025% and about 0.3%, between about 0.025% and about 0.2%, between about 0.025% and about 0.1%, between about 0.05% and about 0.1%, between about 0.1% and about 0.2%, between about 0.2% and about 0.3%, between about 0.3% and about 0.4%, between about 0.4% and about 0.5%, or between about 0.5% and about 0.6% by weight of sodium. In some embodiments, the meat structured protein products comprise only organic ingredients. In some embodiments, the meat structured protein products comprise only local ingredients (e.g., ingredients harvested no more than about 1 mile, about 5 miles, about 10 miles, about 15 miles, about 25 miles, about 50 miles, about 100 miles, about 500 miles, or about 1,000 miles away). In some embodiments, the meat structured protein products comprise no soy. In some embodiments, the meat structured protein products comprise less than about 100 ppm, less than about 50 ppm, less than about 40 ppm, less than about 30 ppm, less than about 20 ppm, or less than about 10 ppm of acrylamide.

The meat structured protein products provided herein may have any shape and form. Exemplary shapes include but are not limited to crumbles, strips, slabs, steaks, cutlets, patties, nuggets, loafs, tube-like, noodle-like, hat dogs, ground meat, sausages, steaks, filets, roasts, breasts, thighs, wings, meatballs, meatloaf, bacon, strips, fingers nuggets, cutlets, cubes, chunks, and poppers. In some embodiments, the meat structured protein products have the shape of crumbles with dimensions of between about 2 mm and about 25 mm width, between about 2 mm and about 25 mm thickness, and between about 2 mm and about 50 mm length. In some embodiments, the meat structured protein products have the shape of strips with widths of between about 1 cm and about 8 cm and lengths of between about 5 cm and about 30 cm. In some embodiments, the meat structured protein products provided herein have the shape of slabs with widths of between about 30 mm and about 110 cm. In some embodiments, the meat structured protein products provided herein have a thickness of between about 2 mm and about 15 mm, between about 3 mm and about 12 mm, between about 4 mm and about 10 mm, or between about 5 mm and about 8 mm. In some embodiments, the meat structured protein products provided herein have the same thickness across at least about 95%, at least about 90%, at least about 80%, at least about 70%, at least about 60%, or at least about 50% of their length or width. In some embodiments, the meat structured protein products provided herein have the same thickness across no more than about 50%, no more than about 40%, no more than about 30%, no more than about 20%, or no more than about 10% of their width or length.

The meat structured protein products can be sliced, cut, ground, shredded, grated, or otherwise processed, or left unprocessed. Examples of sliced forms include but are not limited to dried meats, cured meats, and sliced lunch meats. The meat structured protein products may also be stuffed into permeable or impermeable casings to form sausages. In some embodiments, the meat structured protein products provided herein are shredded and then bound together, chunked and formed, ground and formed, or chopped and formed according in compliance with Food Standards and Labeling Policy Book (USDA, August 2005) guidelines as pertaining to animal jerky.

In some embodiments, the meat structured protein products provided herein are shaped into patties. The patties can have any shape, including but not limited to square, rectangular, circular, and non-geometric. In some embodiments, the patties are circular and have diameters of between about 80 mm and 100 mm and thicknesses of between about 4 mm and about 85 mm. Patty cohesiveness can be achieved by the addition of a binding agent. Examples of suitable binding agents include but are not limited to carob bean gum, cornstarch, dried whole eggs, dried egg whites, gum arabic, konjac flour maltodextrin, potato flakes, tapioca starch, wheat gluten, vegetable gum, carageenan, methylcellulose, and xanthan gum. A suitable binding agent can be identified by titrating different binding agents against the cohesiveness and fracturability of the patty. In some embodiments, the binding agent is carageenan. In other embodiments, the binding agent is methyl cellulose. In preferred embodiments, the binding agent is a mixture of carageenan and methylcellulose.

The meat structured protein products provided herein may be prepared for human or animal consumption. They may be cooked, partially cooked, or frozen either in uncooked, partially cooked, or cooked state. Cooking may include frying either as sautéing or as deep-frying, baking, smoking, impingement cooking, steaming, and combinations thereof. In some embodiments, the meat structured protein products are used in cooked meals, including but not limited to soups, burritos, chilis, sandwiches, lasagnas, pasta sauces, stews, kebabs, pizza toppings, and meat sticks. In some embodiments, the meat structured protein products are mixed with other protein products, including but not limited to other plant-derived products and/or animal meat.

Process for Producing Meat Structured Protein Products

In another aspect, provided herein are methods for producing the meat structured protein products provided herein.

A variety of production processes may be utilized to produce the meat structured protein products provided herein. Suitable processes generally comprise three steps: (1) initial blending of liquid and dry mixes to form a dough, (2) shearing and heating to denature proteins and to produce aligned protein fibers (e.g., via application of mechanical energy [e.g., spinning, agitating, shaking, shearing, pressure, turbulence, impingement, confluence, beating, friction, wave], radiation energy [e.g., microwave, electromagnetic], thermal energy [e.g., heating, steam texturizing], enzymatic activity [e.g., transglutaminase activity], chemical reagents [e.g., pH adjusting agents, kosmotropic salts, chaotropic salts, gypsum, surfactants, emulsifiers, fatty acids, amino acids]), and (3) setting to fix the fibrous structure (e.g., via rapid temperature and/or pressure change, rapid dehydration, redox, or chemical fixation). Any of these processes may be used to produce the meat structured protein products provided herein.

In some embodiments, the meat structured protein products provided herein are produced by thermoplastic extrusion. Thermoplastic extrusion (also known as extrusion cooking) is a process wherein a dry mix (e.g., protein, carbohydrate, lipid) and a liquid mix (e.g., water) are fed into a closed barrel. The barrel contains one or more screw shafts that mix the mixture into a dough, convey the dough forward, and impart shear/mechanical pressure. As the dough advances along successive zones of the barrel, pressure and heat are increased, and the dough is converted into a thermoplastic melt in which proteins undergo extensive heat denaturation (causing structural changes such as breakage of hydrophobic and hydrogen bonds, hydrolysis of disulfide bonds, and formation of new covalent and non-covalent bonds). The directional shear force furthermore causes alignment of the high molecular components in the melt, leading to the formation of aligned protein fibers. When the mass is finally pushed through a cooling die, the newly generated structure is fixed in a final protein fibrous product. The protein fibrous product can be formed into any shape by using a suitable cooling die configuration, and can be cut to any size, for example by a blade chopper.

Any physiochemical parameter or extruder configuration parameter may influence the appearance, texture, and properties of the protein fibrous product. The physiochemical parameters include but are not limited to the formulation of the dough (e.g., protein type and content, carbohydrate type and content, lipid type and content, water content, other ingredients) and the cooking temperature. Configuration parameters include but are not limited to the extruder screw and barrel configuration (and resulting screw-induced shear pressure), heating profile across the heating zones, and dimensions of the cooling die. The physiochemical and configuration parameters are not mutually exclusive. Optimal physiological and configuration parameters for the thermoplastic extrusion of the meat structured protein products provided herein can be determined experimentally by titrating a particular parameter against the structure, sensory, and physical chemical characteristics (e.g., microscopic protein structure, sensory panel scores, MC, mechanical characteristics) of the end products, and identifying the setting of the parameter at which the meat structured protein products provided herein are obtained. Such titrations have provided specific physiochemical and configuration parameters suitable for the production of the meat structured protein products provided herein, as exemplified in Example 1.

The extruder may be selected from any commercially available extruder. Suitable extruders include but are not limited to the extruders described in U.S. Pat. Nos. 4,600,311; 4,763,569; 4.118,164; and 3,117,006, which are hereby incorporated by reference in their entirety, and commercially available extruders such as the MPF 50/25 (APV Baker Inc., Grand Rapids, Mich.), BC-72 (Clextral, Inc., Tampa, Fla.), TX-57 (Wenger Manufacturing, Inc., Sabetha, Kans.), TX-168 (Wenger Manufacturing, Inc., Sabetha, Kans.), and TX-52 models (Wenger Manufacturing, Inc., Sabetha, Kans.). In some embodiments, the temperature of each successive heating zone of the extruder barrel exceeds the temperature of the previous heating zone by between about 10° C. and about 70° C. Heating can be mechanical heating (i.e., heat generated by the turning of extruder screws), electrical heating, or a combination of mechanical and electrical heating. In preferred embodiments, heating is about 10% mechanical heating and about 90% electrical heating. In preferred embodiments, the temperature of the thermoplastic melt at the point of exit from the last heating zone is between about 95° C. and about 180° C., between about 110° C. and about 165° C., between about 115° C. and about 145° C., or between about 115° C. and about 135° C. In some embodiments, the pressure in the cooling die is between about 5 psi and about 500 psi, between about 10 psi and about 300 psi, between about 30 psi and about 200 psi, between about 70 psi and about 150 psi, between about 100 psi and about 200 psi, between about 150 psi and about 300 psi, between about 200 psi and about 300 psi, between about 250 and 300 psi, or between about 300 psi and about 500 psi.

In some embodiments, the meat structured protein products provided herein are generated by thermoplastic extrusion or other production process wherein the dough comprises at least about 0.01% by weight of cell wall material.

The cell wall material may be derived from a single natural source or from multiple natural sources. In some embodiments, the dough comprises between about 0.02% and about 10%, between about 0.1% and about 7%, between about 0.1% and about 5%, between about 1% and about 10%, between about 1% and about 7%, between about 1% and about 5%, between about 0.02% and about 0.1%, between about 0.1% and about 1%, between about 0.5% and about 1.5%, between about 1% and about 2%, between about 5% and about 10%, between about 7% and about 10%, or between about 5% and about 7% by weight of cell wall material. The cell wall material may be added to the dough in any form, including but not limited to dry powder, liquid, slurry, and mixtures thereof. In some embodiments, the dough comprises at least about 0.02% by weight of yeast cell wall material.

In some embodiments, the dough comprises at least about 0.002% by weight of a polysaccharide found in cell walls. The polysaccharide may be comprised of identical polysaccharide molecules or of a mixture of polysaccharide molecules having at least 2 different primary structures. In some embodiments, the polysaccharide is native to the natural source from which the cell wall material is derived. In some such embodiments, the polysaccharide is produced when the natural source is grown under controlled conditions (e.g., aerobic conditions, anaerobic conditions, pH changes, salt conditions, temperature changes, nutrient [e.g., carbon, nitrogen, sulfur] limitations). In other embodiments, the polysaccharide is not native to the natural source from which the cell wall material is derived. In some embodiments, the polysaccharide is a polysaccharide native to a plant. In some such embodiments, the polysaccharide is selected from the group consisting of cellulose, xyloglucan, and pectin. In other embodiments, the polysaccharide is a polysaccharide native to an algae. In some such embodiments, the polysaccharide is selected from the group consisting of cellulose, mannans, xylans, alginic acid, sulfonate polysaccharides, agarose, carrageenan, porphyran, furcellaran, and funoran. In yet other embodiments, the polysaccharide is a polysaccharide native to a fungus. In some such embodiments, the polysaccharide is selected from the group consisting of mannan, chitin, chitosan, and b-glucans. In yet other embodiments, the polysaccharide is a polysaccharide native to a bacterium. In some such embodiments, the polysaccharide is bacterial murein.

In some embodiments, the dough comprises at least about 0.002% by weight of another compound found in cell walls. In some embodiments, such compound is a glycoprotein. In other embodiments, such compound is orthosilicic acid.

The dough comprises at least about 10% by weight of protein. In some embodiments, the dough comprises between about 10% and about 70%, between about 20% and about 60%, between about 30% and about 50%, between about 34% and about 50%, between about 30% and about 60%, between about 40% and about 70%, or between about 40% and about 60% by weight of protein. Since the doughs provided herein ultimately result in the meat structured protein products provided herein, the same protein as described in the composition of the meat structured protein products can be utilized in making the doughs. The protein may be added to the dough in any form, including but not limited to protein concentrate, protein isolate, or protein flour; natured, denatured, or renatured protein; dried, spray dried, or not dried protein; enzymatically treated or untreated protein; and mixtures thereof. The protein added to the dough may consist of particles of any size, and may be pure or mixed with other components (e.g., other plant source components). In some embodiments, the protein is added to the dough in a preparation that has an alkaline pH. The dough typically comprises at least some protein derived from plant. In some such embodiments, the dough comprises pea protein. The pea protein may be added to the dough in the form of pea protein concentrate, pea protein isolate, pea flour, or mixtures thereof, or in any other form. In some embodiments, the dough comprises between about 10% and about 70%, between about 20% and about 60%, between about 30% and about 50%, between about 40% and about 60%, or between about 34% and about 46% by weight of *Pisum sativum* protein.

The dough further comprises a MC of at least 30% by weight. In some embodiments, the dough comprises a MC of between about 30% and about 70%, between about 40% and about 60%, between about 33% and about 45%, between about 40% and about 50% between about 30% and about 60%, between about 50% and about 70%, or between about 55% and about 65% by weight.

The dough can optionally further comprise lipid. In some embodiments, the dough comprises between about 1% and about 10%, between about 2% and about 8%, between about 2% and about 6%, between about 2% and about 5%, between about 2% and about 4%, between about 3% and about 6%, between about 3% and about 5%, between about 3% and about 4%, between about 4% and about 5%, or between about 5% and about 10% by weight of lipid. In some embodiments, the dough comprises less than about 2%, less than about 1%, less than about 0.5%, less than about 0.25%, less than about 0.1%, or less than about 0.005% by weight of saturated fat. Since the doughs provided herein ultimately result in the meat structured protein products provided herein, the same lipid as described in the composition of the meat structured protein products can be utilized in making the doughs.

The dough can optionally further comprise carbohydrate. In some embodiments, the dough comprises between about 1% and about 20%, between about 1% and about 10%, between about 2% and about 9%, between about 2% and about 4%, between about 1% and about 5%, between about 1% and about 3% or between about 5% and about 15% by weight of carbohydrate. In some embodiments, the dough comprises between about 0.2% to about 3% by weight of starch. In some embodiments, the dough comprises pea starch. In some such embodiments, the dough comprises between about 0.2% and about 3%, between about 1% and about 3%, or between about 2% and about 3% by weight of *Pisum sativum* starch. In some embodiments, the dough comprises between about 0.1% and about 5%, between about 0.1% and about 3%, between about 0.1% and about 2%, between about 0.1% and about 1%, or between about 0.4% and about 0.6% by weight of edible fiber. Since the doughs provided herein ultimately result in the meat structured protein products provided herein, the same carbohydrate as described in the composition of the meat structured protein products can be utilized in making the doughs. In some embodiments, at least some of the carbohydrate is derived from plant. In a preferred embodiment, the dough comprises at least some carbohydrate that is derived from pea.

In some embodiments, the dough comprises 5% or less by weight of one or more ingredients derived from animal. Without being bound by theory, it is believed that such small amount of an animal ingredient may improve the texture, color, aroma, or taste of certain embodiments of the meat structured protein products provided herein. Examples of suitable animal ingredients include but are not limited to animal meat and components thereof, including interstitial fluid extracted from animal meat.

Cell Wall Material

The process of preparing cell wall material may comprise any of the following steps, in or out of order: a) selecting one or more suitable natural or modified natural sources; b) growing the natural or modified natural sources; c) harvesting and washing the natural or modified natural sources; and d) isolating the cell wall material.

Selecting one or more suitable natural or modified natural sources may entail an assessment of the food value and the production process compatibility of the natural or modified natural sources. Such assessment may include but is not limited to assessment of the type of carbon source used by a natural or modified natural source; the safety of a natural or modified natural source; the growth characteristics of a natural or modified natural source; the ability to separate the natural juice from undesired components or toxic substances of a natural or modified natural source; and the nutritional value of the natural juice derived from a natural or modified natural source (e.g., protein content, amino acid composition, content of essential amino acids, content of sulfur-containing amino acids, lipid content, proportion of fatty acids/sterols/phospholipids, nitrogen content, proportion of nucleic acid/amino acid/purine bases/pyrimidine bases, water content, fiber content, major mineral [e.g., Na, K, Mg, Ca, Cl] content, trace element [e.g., Mn, Zn, Cu, Fe, Co, Mo, As, Pb, Hg] content, carbohydrate content, and vitamin content).

Growing the natural or modified natural sources may entail growing the natural or modified natural sources under native conditions or under controlled conditions. Microbes may be grown in fermentation or non-fermentation cultures, to exponential growth or stationary phase, to low or high (OD600>1) density, in batch, fed-batch, or continuous mode. Alternatively, waste streams can be obtained from commercial facilities, including but not limited to breweries, wine production companies, and biofuel companies that use microbes as fermentation organisms.

Harvesting the natural or modified natural sources may entail collection of any or all parts of the natural or modified natural sources, including but not limited to stem, leaf, bark, seed, bud, follicle, ovary, and fruit of plants. Harvesting of microbes may entail sedimentation (e.g., by centrifugation). Washing the natural or modified natural sources may utilize any method at any scale, including single wash, multiple washes, and counter-current washes. Microbes can also be used as culture broths without further harvesting and/or washing.

Cell wall material may be isolated from fresh, frozen, or dried natural sources. Methods for isolating cell wall material are well known in the art (see, for example, patents EP453316, EP460945, FR2179528, U.S. Pat. No. 5,686,296, and U.S. Pat. No. 5,968,811). Cell wall isolation may comprise any of the following steps, in or out of order: a) dissociation to break up the natural or modified natural source; b) disruption of cell walls and/or membranes to release intracellular compounds; c) isolating the cell wall material, and d) further treatment.

Dissociation can, for example, be achieved by grinding (e.g., using Waring Blender, Polytron, mortar and pestle), shaking, centrifuging, tituration, or shearing. A suitable example of a dissociation method is cold pressing, in which the natural or modified natural source is gently ground into pulp that is then squeezed with a powerful press to release fluid.

Disruption of cell walls and/or membranes can occur by physical methods, biologic methods, chemical methods, or combinations thereof. Physical methods mechanically disrupt cell walls or membranes using, for example, pressure, grinding (e.g., between abrasive particles), collision, heat, shear (e.g., by liquid homogenization using Dounce homogenizer, Potter-Elvehjem homogenizer, or French Press; or by microfluidics, tituration, e.g., using a pressure of between 1,000 and 25,000 psi), pulsed electric field (PEF), high frequency sound, blending, centrifugation, osmotic pressure (e.g., rapid changes in external osmolarity), or temperature (e.g., freeze-thaw cycling). Biologic methods typically employ enzymes that can break down cell walls or membranes and any other internal resistance for transporting bioactive compounds from internal matrix to the external solution (e.g., beta(1-6) glycanases, beta(1-3)glycanase, proteases, chitinases, zymolase, and mannases). Chemical methods typically employ chemicals that can permeabilize inner or outer cell membranes using, for example, organic solvents (e.g., toluene, ether, phenylethyl alcohol, DMSO, benzene, methanol, chloroform), salts, acids, bases, antibiotics, thionins, surfactants (e.g., Triton, Brij, Duponal), chaotropic agents (e.g., urea, guanidine), or chelating agents (e.g., EDTA). In some embodiments, cell walls and/or membranes are disrupted by autolysis or plasmolysis, wherein the cells respond to heat, changes in pH, or changes to extracellular osmolarity by releasing enzymes from their lysosomes that break down the cells. To aid the disruption process and protect the released intracellular compounds, various agents may be added, including but not limited to DNase, RNase, and protease inhibitors. In one embodiment, the natural source is lysed by extruding a microbial slurry under high pressure and through small orifices, before the lysed microbial preparation is used directly or after further processing in a method for the production of a meat structured protein product as provided herein. In one such embodiment, the natural source is run once or repeatedly through a microfluidizer at about 1,000 to about 30,000 psi. In another embodiment, the natural source is lysed in the extruder using variations in paddle orientation, screw speed, heat, density of materials, changes in heat, changes in back pressure, or changes is flow rates of dry materials, water, biomass, or any other ingredient. Without being bound by theory, it is believed that lysing natural sources not prior to but during the food production process (e.g., during extrusion) may reduce levels of monosodium glutamate (MSG) or free glutamate in the food products because the microbial proteases are immediately inactivated (e.g., by mechanical shear or cooking temperature) and cannot degrade proteins into free amino acids.

Isolating the cell wall material from soluble and whole cell components can be achieved by filtration or centrifugation. Filtration may entail passage through a strainer or cheese cloth such that solid material is separated from liquid material. Alternatively, solids may be allowed to settle and liquid is poured from the top. Prior or subsequent to filtration, additional compounds may be removed from the cell wall material. Extraction may occur by any suitable extraction method that removes inter- or intracellular compounds, including but not limited to solvent extraction. For solvent extraction the cell wall material may be combined with any solvent suitable for extracting a compound of interest, including but not limited to water, alcohol, oil, glycerine, supercritical carbon dioxide, hypercritical carbon dioxide, and mixtures thereof. Incubating may occur for any suitable duration and at any suitable temperature or suitable agitation. Extraction can also involve enfleurage (cold or hot), steam distillation, hydro diffusion, cohobation, rectification, percolation, chromatography, fraction distillation, phytonic process, florasol extraction, expression, sponge expression, Ecuelle a Piquer, or machine abrasion.

The isolated cell wall material may be resuspended in a suitable solution (e.g., water) to form a suspension, paste, or slurry. Alternatively, it can be dried, using for example a freeze or spray dryer, rotary vacuum, lyophilizer, or evaporator, to obtain clumped or not clumped powdered preparations.

The cell wall material may be further treated to maintain purity and/or freshness, employing standard food chemistry or shelf life preservation methods, including but not limited to centrifugation, enzymatic break down, enzymatic alteration, partial dehydration, extraction (solid phase or liquid-liquid extraction and variations thereof), buffering, dialysis, precipitation, crystallization, pH isoelectric focusing, denaturing, chromatography (e.g., reverse-phase, affinity, displacement, ion exchange, liquid, size-exclusion chromatography), alkaline treatment (e.g., using potassium hydroxide, sodium hydroxide, calcium hydroxide), oxidation (e.g., using hydrogen peroxide), anti-oxidation (e.g., using ascorbic acid), reduction, or addition of scavenging agents (e.g., charcoal). U.S. Pat. No. 5,686,296 discloses a method of processing yeast cell wall material to make them acceptable as food grade, pharmaceutical and cosmetic ingredients. In some embodiments, the cell wall material is resuspended in a solution comprising calcium hydroxide, wherein the resulting slurry has a pH of between about 7 and about 8.5. In other embodiments, the cell wall material is resuspended in a solution comprising hydrochloric acid, wherein the resulting slurry has a pH of between about 3 and about 7. In yet other embodiments, the cell wall material is resuspended in a solution comprising hydrochloric acid, wherein the resulting slurry has a pH of less than about 3.

In some embodiments, the cell wall material is derivatized, for example by aggregation or agglomeration (e.g., by treating with oils or cross linking agents), dispersal (e.g., by sonication or microfluidization), fragmentation (e.g., by sonication or microfluidization), coating (e.g., by microencapsulation in lipids, phospholipids, alginates, gels, waxes, cellulose, glycoprotein, polysaccharide, starches, gums, silica shells, biopolymers or synthetic polymers by melt extrusion, melt injection, microfluidization, emulsification, fluid bed coating, inkjet or 3D printing, deposition, or by liposome entrapment), sealing (e.g., using surfactants or gums), addition of functional chemical groups, or addition of silicates. In some embodiments the cell walls are functionalized or encapsulated as they are present in living or dead cells.

The cell wall material may be pure or may contain components of the growth environment (e.g., fermentation, culture). Examples of such components include but are not limited to DNA, glycerol, ergosterol, neutraceuticals, anti-oxidants, RNA, leghemoglobin, plant collagen-like proteins, actin, SOD, catalase, ergosterol pathway proteins, squalene, catecholamines, terpenes, transglutaminase, hydrolase, peroxidase, oxidoreductase, and the natural source proteome.

Cell wall material can also be obtained from commercial sources, such as, for example, Springcell yeast cell walls from Lesaffre Yeast Corporation & Red Star Yeast Company (Milwaukee, Wisc.), SIY Cell Hulls™ from Lallemand (Montreal, Canada), Extraferm® yeast hulls from DSM Food Specialties (Heerlen, Netherlands), Auxoferm HCT from Ohly GmbH (Hamburg, Germany), and yeast hulls or yeast cell walls from Angel Yeast Co., LTD (Hubei, China).

In some embodiments, compounds are bound to the cell wall material. Suitable methods for binding compounds to cell wall material include but are not limited to hydration, passive absorption, microfluidization, emulsification, sanitation, ultra-sonication, pressurization, dounce homogenization, heating, salting, cooking, use of surfactants, vacuuming, centrifugation, osmosis, and electrical binding (see, for example, patents U.S. Pat. No. 4,001,480, EP85805, EP242135, EP85805, WO/2005/067733, WO1993011869, WO2005030383, U.S. Pat. No. 4,001,480; and publications Bishop et al. Microencapsulation in Yeast. *Journal of Microencapsulation.* 1998. 15(6): 761-773; Dardelle et al. Flavour-encapsulation and flavour-release performances of a commercial yeast-based delivery system. *Food Hydrocolloids* (2007) 21: 953-960; Duckham et al. Microencapsulation in yeast cells—Structure and function: A cryo SEM approach. In: *Proceedings of the 14th International Symposium on Microencapsulation,* Sep. 4-6,2003, Singapore; Kilcher et al. Probing (macro)molecular transport through cell walls. *Faraday Discuss.* 2008. 139: 199-212; Nelson et al. Microencapsulation in yeast cells and Application in Drug Delivery. *Polymeric Drug Delivery* 2006, *ACS Symposium Series* 923, Chapter 19, 268-281; Normand et al. Flavour Encapsulation in Yeasts: Limonene used as a Model System for Characterization of the Release Mechanism. *Journal of Agricultural & Food Chemistry.* 2005. 53: 7532-7542; Guorong et al. Stabilization and encapsulation of photosensitive resveratrol within yeast cell. *International Journal of Pharmaceutics.* 2008. 349: 83-93.).

The cell wall material may comprise proteins, lipids, carbohydrates, and other compounds. These components can be native to the natural source from which the cell wall material is derived, produced by the modified natural source from which the cell wall material is derived, produced by the natural source or the modified natural source when the natural source or modified natural source is grown under controlled conditions (e.g., aerobic conditions, anaerobic conditions, pH changes, salt conditions, temperature changes, nutrient [e.g., carbon, nitrogen, sulfur] limitations), or added to the cell wall material during or after extraction or preparation of the cell wall material.

Other Ingredients

The doughs, meat structured protein products, and extended meat products provided herein may comprise various other ingredients. In most embodiments, the doughs, meat structured protein products, or extended meat products provided herein comprise any one of these other ingredients at between about 0.01% and about 5% by weight.

Examples of such ingredients include but are not limited to amino acids and amino acid derivatives (e.g., 1-aminocyclopropane-1-carboxylic acid, 2-aminoisobutyric acid, alanine, arginine, aspartic acid, canavanine, catecholamine, citruline, cysteine, essential amino acids, glutamate, glutamic acid, glutamine, glycine, histidine, homocysteine, hydroxyproline, hypusine, isoleucine, lanthionine, leucine, lysine, lysinoalanine, methionine, mimosine, non-essential amino acids, ornithine, phenylalanine, phenylpropanoids, photoleucine, photomethionine, photoreactive amino acids, proline, pyrrolysine, selenocysteine, serine, threonine, tryptophan, tyrosine, valine), anti-inflammatory agents (e.g., leukotriene antagonists, lipoxins, resolvins), antibiotics (e.g., alamethicin, erythromycin, tetracyclines), antimicrobial agents (e.g., potassium sorbate), antiparasitic agents (e.g., avermectins), buffering agents (e.g., citrate), clotting agents (e.g., thromboxane), coagulants (e.g., fumarate), coenzymes (e.g., coenzyme A, coenzyme C, s-adenosylmethionine, vitamin derivatives), crosslinking agents (e.g., beta 1,3 glucan transglutaminase, calcium salts, magnesium salts), dairy protein (e.g., casein, whey protein), dietary minerals (e.g., ammonium, calcium, fat soluble minerals, gypsum, iron, magnesium, potassium, aluminum), disaccharides (e.g., lactose, maltose, trehalose), edulcorants (e.g., artificial sweeteners, corn sweeteners, sugars), egg protein (e.g., ovalbumin, ovoglobulin, ovomucin, ovomucoid, ovotransferrin, ovovitella, ovovitellin), elasticizing agents (e.g., gluten), emulsifiers (e.g., lecithin, lecithins), enzymes (e.g., hydrolase, oxidoreductase, peroxidase), essential nutrients (e.g., alpha-linolenic acid, gamma-linolenic acid, linoleic acid, calcium, iron, omega-3 fatty acids, zinc), fat soluble compounds, flavones (e.g., apigenin, chrysin, luteolin, flavonols, daemfero, datiscetin, myricetin), glycoproteins, gums (e.g., carob bean gum, guar gum, tragacanth gum, xanthan gum), hemoproteins (e.g., hemoglobin, leghemoglobin, myoglobin), humectants (e.g., polyethylene glycol, propylene glycol, sorbitol, xylitol), isoprenes, isoprenoid pathway compounds (e.g., mevalonic acid, dimethylallyl pyrophosphate, isopentenyl pyrophosphate), isoprenoids or isoprenoid derivatives (e.g., dolichols, polyprenols), liver X receptor (LXR) agonists and antagonists, meat proteins (e.g., collagen), mechanically separated meat, metabolic pathway intermediates (e.g., oxaloacetate, succinyl-CoA), monosaccharides (e.g., fructose, galactose, glucose, lactose, lyxose, maltose, mannose, ribose, ribulose, xylulose), neuroactive compounds (e.g., anandamide, cannabinoids, cortisol, endocannabinoids, gamma-aminobutyric acid, inositol), neutraceuticals, nucleic acids (e.g., DNA, RNA, rRNA, tRNA), nutritional supplements (e.g., carnitine, fumarate, glucosamine), oil-soluble compounds, organ meat, oxidizing agents (e.g., quinones), partially defatted tissue and blood serum proteins, plasticizing materials, polyols (e.g., alkylene glycols, butanediols, glycerine, glycerol, glycerol, mannitol, propylene glycol, sorbitol, xylitol), polysaccharides (e.g., pectin, maltodextrin, glycogen, inulin), porphyrins, secondary metabolites (e.g., polyketides), secosteroids, spices, steroids (e.g., C18-carbon containing steroids, C19-carbon containing steroids, C21-carbon containing steroids, cholesterol, cycloartenol, estradiol, lanosterol, squalene), sterols (e.g., betasitosterol, brassicasterol, cholesterol, ergosterol, lanosterol, oxysterols, phytosterols, stigmasterol), tannins (e.g., ellagic tannins, ellagic tannins from roasted oak wood, gallic tannins, proanthocyanidin tannins from aromatic grape skin, proanthocyanidin tannins from grape seeds, proanthocyanidin tannins from grape skin, profisetinidin tannins, tannins from green tea leaves, tannins from sangre de drago), terpenes (e.g., diterpenes, monoterpenes, sesquiterpene, squalane, tetraterpenes, triterpenes), thickening agents (e.g., guar gum, pectin, xanthan gum, agar, alginic acid and its salts, carboxymethyl cellulose, carrageenan and its salts, gums, modified starches, pectins, processed Eucheuma seaweed, sodium carboxymethyl cellulose, tara gum), vitamins (e.g., alpha-tocopherol, alpha-tocotrienol, beta-tocopherol, beta-tocotrienol, delta-tocopherol, delta-tocotrienols, fat soluble vitamins, gamma-tocopherol, gamma-tocotrienol, pantothenic acid, vitamin A, vitamin B-12, vitamin B-12, vitamin C, vitamin D, vitamin E, vitamin E, vitamin K, water soluble vitamins), water-soluble compounds, wax esters, and xenoestrogens (e.g., phytoestrogens).

Further examples include but are not limited to antioxidants (e.g., carotenes, ubiquinone, resveratrol, alpha-tocopherol, lutein, zeaxanthin, "2,4-(tris-3',5'-bitert-butyl-4'-hydroxybenzyl)-mesitylene (i.e., Ionox 330)", "2,4,5-trihydroxybutyrophenone", "2,6-di-tert-butyiphenol", "2,6-di-tert-butyl-4-hydroxymethylphenol (i.e., Ionox 100)", "3,4-dihydroxybenzoic acid", 5-methoxy tryptamine, "6-ethoxy 1,2-dihydro-2,2,4-trimethylquinoline", acetyl gallate, alpha-carotene, alpha-hydroxybenzyl phosphinic acid, alphaketoglutarate, anoxomer, ascorbic acid and its salts, ascorbyl palmitate, ascorbyl stearate, benzyl isothiocyanate, beta naphthoflavone, beta-apo-carotenoic acid, beta-carotene, beta-carotene, butylated hydroxyanisole (BHA), butylated hydroxytoluene (BHT), caffeic acid, canthaxantin, carnosol, carvacrol, catalase, catechins, chlorogenic acid, citric acid and its salts, clove extract, coffee bean extract, di-stearyl thiodipropionate, dilauryl thiodipropionate, dodecyl gallate, edetic acid, ellagic acid, erythorbic acid, esculetin, esculin, ethyl gallate, ethyl maltol, ethylenediaminetetraacetic acid (EDTA), eucalyptus extract, eugenol, ferulic acid, flavanones, flavones, flavonoids, flavonoids, flavonols, fraxetin, fumaric acid, gallic acid, gentian extract, gluconic acid, glycine, gum guaiacum, hesperetin, hydroquinone, hydroxycinammic acid, hydroxyglutaric acid, hydroxytryrosol, hydroxyurea, isoflavones, lactic acid and its salts, lecithin, lecithin citrate; R-alpha-lipoic acid, lutein, lycopene, malic acid, maltol, methyl gallate, mono iso-propyl citrate, monoglyceride citrate, morin, N-acetylcysteine, N-hydroxysuccinic acid, "N,N'-diphenyl-p-phenylenediamine (DPPD)", natural antioxidants, nordihydroguaiaretic acid (NDGA), octyl gallate, oxalic acid, p-coumaric acid, palmityl citrate, phenothiazine, phosphates, phosphatidylcholine, phosphoric acid, phytic acid, phytylubichromel, pimento extract, polyphosphates, propyl gallate, quercetin, retinyl palmitate, rice bran extract, rosemary extract, rosmarinic acid, sage extract, sesamol, silymarin, sinapic acid, sodium erythorbate, stearyl citrate, succinic acid, superoxide dismutase (SOD), synthetic antioxidants, syringic acid, tartaric acid, taurine, tertiary butyl hydroquinone (TBHO), thiodipropionic acid, thymol, tocopherols, tocotrienols, trans resveratrol, trihydroxy butyrophenone, tryptamine, tyramine, tyrosol, ubiquinone, uric acid, vanillic acid, vitamin K and derivates, wheat germ oil, zeaxanthin).

Further examples include but are not limited to coloring agents (e.g., FD&C (Food Drug & cosmetics) Red Nos. 14 (erythrosine), FD&C Red Nos. 17 (allura red), FD&C Red Nos. 3 (carmosine), FD&C Red Nos. 4 (fast red E), FD&C Red Nos. 40 (allura red AC), FD&C Red Nos. 7 (ponceau 4R), FD&C Red Nos. 9 (amaranth), FD&C Yellow Nos. 13 (quinoline yellow) , FD&C Yellow Nos. 5 (tartazine), FD&C Yellow Nos. 6 (sunset yellow), artificial colorants, natural colorants, titanium oxide, annatto, anthocyanins, beet juice, beta-APE 8 carotenal, beta-carotene, black currant, burnt sugar, canthaxanthin, caramel, carmine/carminic acid, cochineal extract, curcumin, lutein, mixed carotenoids, monascus, paprika, red cabbage juice, riboflavin, saffron, titanium dioxide, turmeric).

Further examples include but are not limited to flavor enhancers and flavoring agents (e.g., 5'-ribonucleotide salts, glutamic acid salts, glycine salts, guanylic acid salts, hydrolyzed proteins, hydrolyzed vegetable proteins, insomniac acid salts, monosodium glutamate, sodium chloride, galacto-oligosaccharides, sorbitol, animal meat flavor, animal meat oil, artificial flavoring agents, aspartame, fumarate, garlic flavor, herb flavor, malate, natural flavoring agents, natural smoke extract, natural smoke solution, onion flavor, shiitake extract, spice extract, spice oil, sugars, yeast extract).

Further examples include but are not limited to pH adjusting agents (i.e., agents that raise or lower the pH of a solution). The pH adjusting agent may be organic or inorganic. Examples of suitable pH adjusting agents include but are not limited to salts, ionic salts, alkali metals, alkaline earth metals, and monovalent or divalent cationic metals. Examples of suitable salts include but are not limited to hydroxides, carbonates, bicarbonates, chlorides, gluconates, acetates, or sulfides. Examples of suitable monovalent or divalent cationic metals include but are not limited to calcium, sodium, potassium, and magnesium. Examples of suitable acidic pH adjusting agents include but are not limited to acetic acid, hydrochloric acid, citric acid, succinic acid, and combinations thereof. Examples of suitable basic pH adjusting agents include but are not limited to potassium bicarbonate, sodium bicarbonate, sodium hydroxide, potassium hydroxide, calcium hydroxide, ethanolamine, calcium bicarbonate, calcium hydroxide, ferrous hydroxide, lime, calcium carbonate, trisodium phosphate, and combinations thereof.

The ingredients can be native to one or more natural sources; produced by one or more modified natural sources; produced by one or more natural sources or modified natural sources under controlled conditions (e.g., aerobic conditions, anaerobic conditions, pH changes, salt conditions, temperature changes, nutrient [e.g., carbon, nitrogen, sulfur] limitations), or produced synthetically.

Natural Source/Modified Natural Source

The protein, lipid, carbohydrate, or other ingredient of the meat structured protein products provided herein may be derived from one or more natural or modified natural sources.

Suitable natural sources are naturally occurring plants, algae, fungi, or microbes.

Examples of suitable plants include but are not limited to spermatophytes (spermatophyta), acrogymnospermae, angiosperms (magnoliophyta), ginkgoidae, pinidae, mesangiospermae, cycads, *Ginkgo,* conifers, gnetophytes, *ginkgo biloba,* cypress, junipers, thuja, cedarwood, pines, angelica, caraway, coriander, cumin, fennel, parsley, dill, dandelion, helichrysum, marigold, mugwort, safflower, camomile, lettuce, wormwood, calendula, citronella, sages, thyme, chia seed, mustard, olive, coffee, capsicum, eggplant, paprika, cranberry, kiwi, vegetable plants (e.g., carrot, celery), tagetes, tansy, tarragon, sunflower, wintergreen, basil, hyssop, lavender, lemon verbena, marjoram, melissa, patchouli, pennyroyal, peppermint, rosemary, sesame, spearmint, primroses, samara, pepper, pimento, potato, sweet potato, tomato, blueberry, night-shades, petunia, morning glory, lilac, jasmin, honeysuckle, snapdragon, psyllium, wormseed, buckwheat, amaranth, chard, quinoa, spinach, rhubarb, jojoba, cypselea, chlorella, marula, hazel-nut, canola, kale, bok choy, rutabaga, frankincense, myrrh, elemi, hemp, pumpkin, squash, curcurbit, manioc, dalbergia, legume plants (e.g., alfalfa, lentils, beans, clovers, peas, fava coceira, frijole bola roja, frijole negro, lespedeza, licorice, lupin, mesquite, carob, soybean, peanut, tamarind, wisteria, cassia, chickpea, garbanzo, fenugreek, green pea, yellow pea, snow pea, lima bean, fava bean), geranium, flax, pomegranate, cotton, okra, neem, fig, mulberry, clove, *eucalyptus,* tea tree, niaouli, fruiting plants (e.g, apple, apricot, peach, plum, pear, nectarine), strawberry, blackberry, raspberry, cherry, prune, rose, tangerine, citrus (e.g., grapefruit, lemon, lime, orange, bitter orange, mandarin), mango, citrus bergamot, buchu, grape, broccoli, brussels, sprout, camelina, cauliflower, rape, rapeseed (canola), turnip, cabbage, cucumber, watermelon, honeydew melon, zucchini, birch, walnut, cassava, baobab, allspice, almond, breadfruit, sandalwood, macadamia, taro, tuberose, aloe vera, garlic, onion, shallot, vanilla, yucca, vetiver, galangal, barley, corn, curcuma aromatica, ginger, lemon grass, oat, palm, pineapple, rice, rye, sorghum, triticale, turmeric, yam, bamboo, barley, cajuput, canna, cardamom, maize, oat, wheat, cinnamon, sassafras, lindera benzoin, bay laurel, avocado, ylang-ylang, mace, nutmeg, moringa, horsetail, oregano, cilantro, chervil, chive, aggregate fruits, grain plants, herbal plants, leafy vegetables, non-grain legume plants, nut plants, succulent plants, land plants, water plants, delbergia, millets, drupes, schizocarps, flowering plants, non-flowering plants, cultured plants, wild plants, trees, shrubs, flowers, grasses, herbaceous plants, brushes, lianas, cacti, green algae, tropical plants, subtropical plants, temperate plants, and derivatives and crosses thereof.

Examples of suitable algae include but are not limited to viridiplantae, stramenopiles, rhodophyta, chlorophyta, PX, bangiophyceae, florideohpyceae, trebouxiophyceae, phaeophyceae, palmariales, gigartinales, bangiales, gigartinales, *Chlorella, Laminaria japonica, Lammaria saccharina, Laminaria digitata, Macrocystis pyrifera, Alaria marginata, Ascophyllum nodosum, Ecklonia* sp., *Palmaria palmata, Gloiopeltis furcata, Porphyra columbina, Gigartina skottsbergii, Gracilaria lichenoides, Chondrus crispus, Gigartina bursa-pastoris, Rhodophyta, Porphyridium cruentum (P. purpureum), Porphyridium aerugineum, Rhodella maculate, Rhodella reticulata, Rhodella violacea, Palmaria palmata, Rhodymenia palmata, Porphyra tenera, Porphyra columbina, Gigartina skotsbergii, Chondrus crispus, Gracilaria lichenoides, Gracilaria bursa-pastoris* and derivatives and crosses thereof.

Examples of suitable fungi include but are not limited to *Candida etchellsii, Candida guilliermondii, Candida humilis, Candida utilis, Candida versatilis, Debaryomyces hansenii, Kluyveromyces lactis, Kluyveromyces marxianus, Kluyveromyces thermotolerans, Pichia pastoris, Rhodotorula* sp., *Saccharomyces bayanus, Saccharomyces beticus, Saccharomyces cerevisiae, Saccharomyces chevalieri, Saccharomyces diastaticus, Saccharomyces ellipsoideus, Saccharomyces exiguus, Saccharomyces florentinus, Saccharomyces pastorianus, Saccharomyces pombe, Saccharomyces sake, Saccharomyces uvarum, Sporidiobolus johnsonii, Sporidiobolus salmonicolor, Sporobolomyces roseus, Xanthophyllomyces dendrorhous, Yarrowia lipolytica, Zygosaccharomyces rouxii,* and derivatives and crosses thereof.

Examples of suitable microbes include but are not limited to firmicutes, cyanobacteria (blue-green algae), bacilli, oscillatoriophcideae, bacillales, lactobacillales, oscillatoriales, bacillaceae, lactobacillaceae, arthrospira, *Bacillus coagulans, Lactobacillus acidophilus, Lactobacillus Reuteri, Spirulina, Arthrospira platensis, Arthrospira maxima,* and derivatives and crosses thereof.

Natural sources may be obtained from a variety of sources including but not limited to nature (e.g., lakes, oceans, soils, rocks, gardens, forests, plants, animals), brewery stores, and commercial cell banks (e.g., ATCC, collaborative sources).

Modified natural sources may be obtained from a variety of sources including but not limited to brewery stores and commercial cell banks (e.g., ATCC, collaborative sources), or can be generated from natural sources by methods known in the art, including selection, mutation, or gene manipulation. Selection generally involves continuous multiplication and steady increase in dilution rates under selective pressure. Mutation generally involves selection after exposure to mutagenic agents. Gene manipulation generally involves genetic engineering (e.g., gene splicing, insertion of deletions or modifications by homologous recombination) of target genes. A modified natural source may produce a non-native protein, carbohydrate, lipid, or other compound, or produce a non-native amount of a native protein, carbohydrate, lipid, or other compound. In some embodiments, the modified natural source expresses higher or lower levels of a native protein or metabolic pathway compound. In other such embodiments, the modified natural source expresses one or more novel recombinant proteins, RNAs, or metabolic pathway components derived from another plant, algae, microbe, or fungus. In other embodiments, the modified natural source has an increased nutraceutical content compared to its native state. In yet other embodiments, the modified natural source has more favorable growth and production characteristics compared to its native state. In some such embodiments, the modified natural source has an increased specific growth rate compared to its native state. In other such embodiments, the modified natural source can utilize a different carbon source than its native state.

Post-Processing

Protein fibrous products can be further processed to obtain the meat-structured protein products provided herein. Post-processing may involve but is not limited to vacuum tumbling, marinating, dehydrating, hydrating, flavoring, tenderizing, injecting, grilling, boiling in vinegar, contacting with a pH adjusting agent, coloring, or combinations thereof performed either together or in sequence.

Dehydrating can involve water loss of between about 30% and about 90% by weight. In some such embodiments, dehydrating involves water loss of about 40% by weight compared to the protein fibrous product. In some embodiments, dehydrating results in a meat structured protein product that comprises less than about 5% by weight of water compared to the protein fibrous product.

Hydrating or marinating can involve water uptake of up to about 95% by weight compared to the protein fibrous product. In some embodiments, marinating does not involve an increase in MC. In some such embodiments, marinating involves a loss in MC of between about 0.5% and about 10% by weight compared to the protein fibrous product. In some embodiments, hydrating comprises the steps of mixing the protein fibrous product with a lesser, equal, or greater part by weight of water and simmering the mixture in a covered vessel while stirring. In other embodiments, hydrating comprises the step of injecting water into the protein fibrous product using a SpitJack needle injector gun. In some embodiments, marinating comprises the step of mixing the protein fibrous product with a lesser, equal, or greater part by weight of water comprising flavoring, and then vacuum tumbling the mixture in a vacuum tumbler. A hydrating method is exemplified in Example 1.

In some embodiments, post-processing involves mixing with 5% or less by weight of one or more ingredients derived from animal. Without being bound by theory, it is believed that such small amount of an animal ingredient may improve the coagulation, color, aroma, or taste of certain embodiments of the meat structured protein products provided herein. Examples of such ingredients include but are not limited to animal meat and components thereof, including interstitial fluid extracted from animal meat.

It is also within the scope of the present invention that the cell wall material is added to the protein fibrous product during post-processing, for example by soaking, liquid spraying, dry spraying, spray drying, ink jet application, or 3D printing.

Process for Producing Extended Meat Products

It is also within the scope of the present invention that the extended meat products provided herein are produced by extending animal meat products with meat structured protein products as provided herein.

Examples of animal meat products that may be extended with meat structured protein products provided herein include but are not limited to meat obtained from cattle, pork, lamb, mutton, horse, goat, poultry (e.g., chicken, duck, goose, turkey), fowl (any bird species), fresh or salt water fish (e.g., catfish, tuna, sturgeon, salmon, bass, muskie, pike, bowfin, gar, paddlefish, bream, carp, trout, walleye, snakehead, and crappie), shellfish, crustaceans, game animals (e.g., buffalo, deer, elk, moose, reindeer, caribou, antelope, rabbit, bear, squirrel, beaver, muskrat, opossum, raccoon, armadillo, porcupine), and reptiles (e.g., snakes, turtles, lizards). The meat may be intact, in chunks, in steak form, ground, finely textured, trim or residues derived from processing frozen animals, low temperature rendered, mechanically separated or deboned (MDM, which is a meat paste that is recovered from animal bones, and a comminuted product that is devoid of the natural fibrous texture found in intact muscles) (i.e., meat removed from bone by various mechanical means), cooked, or combinations thereof. The meat may include muscle, skin, fat (including rendered fat such as lard and tallow, flavor enhanced animal fats, fractionated or further processed animal fat tissue), or other animal components.

Animal meat products may be extended by blending with meat structured protein products as provided herein before or after other post-processing, optionally together with other constituents, including but not limited to dietary fiber, animal or plant lipid, or animal-derived protein material (e.g. casein, caseinates, whey protein, milk protein concentrate, milk protein isolate, ovalbumin, ovoglobulin, ovomucin, ovomucoid, ovotransferrin, ovovitella, ovovitellin, albumin globulin, and vitellin). Preferably, the blended meat structured protein product and the animal meat have similar particle sizes. The amount of meat structured protein product in relation to the amount of animal meat during blending will vary depending on the intended use of the extended meat product. By way of example, when a significantly vegetarian composition that has a relatively small degree of animal flavor is desired, the concentration of animal meat in final product may be about 45%, about 40%, about 35%, about 30%, about 25%, about 20%, about 15%, or about 10% by weight. Alternatively, when a meat analog composition having a relatively high degree of animal meat flavor is desired, the concentration of animal meat may be about 50%, about 55%, about 60%, about 65%, about 70%, or about 75% by weight. Depending upon the intended use of the extended meat product, the animal meat is typically precooked to partially dehydrate the flesh and to prevent the release of fluids during further processing applications (e.g., such as retort cooking), to remove natural liquids or oils that may have strong flavors, to coagulate the animal protein and loosen the meat from the skeleton, or to develop desirable and textural flavor properties. The precooking process may be carried out in steam, water, oil, hot air, smoke, or a combination thereof. The animal meat is generally heated until the internal temperature is between about 60° C. and about 85° C.

Packaging and Labeling

The meat structured protein products provided herein may be packaged to keep the meat structured protein products clean, fresh, contained, or safe; to facilitate inventory control, handling, distribution, stacking, display, sale, opening, reclosing, use, or reuse; or to enable portion control. Suitable packing includes but is not limited to trays, trays with overwrap, bags, cups, films, jars, tubs, bottles, pads, bowls, platters, boxes, cans, cartons, pallets, wrappers, containers, bags-in-boxes, tubes, capsules, vacuum packaging, pouches, and the like, and combinations thereof. The packaging can be made of plastic, paper, metal, glass, paperboard, polypropylene, PET, Styrofoam, aluminum, or combinations thereof.

The packaging may carry one or more labels that communicate information to the consumer or that support the marketing of the meat structured protein product. In some embodiments, the packaging carries a label required by governmental regulation. In some such embodiments, the label is required by regulation of the U.S. Food and Drug Administration (FDA) or the U.S. Department of Agriculture. In other such embodiments, the label is required by regulation of the European Food Safety Authority. In some embodiments, the governmental regulation is Title 21 of the FDA section of the code of federal regulations. In some embodiments, the label indicates that the enclosed meat structured protein product is free of genetically modified organisms. In some embodiments, the label indicates that the enclosed meat structured protein product is free of gluten. In some embodiments, the label indicates that the enclosed meat structured protein product is Kosher. In some embodiments, the label indicates that the enclosed meat structured protein product is free of cholesterol. In some embodiments, the label indicates that the enclosed meat structured protein product is vegan. In some embodiments, the label indicates that the enclosed meat structured protein product is free of an allergen. In some embodiments, the label indicates that the enclosed meat structured protein product is free of soy. In some embodiments, the label indicates that the enclosed meat structured protein product is free of nuts.

Marketing and Sale

The meat structured protein products provided herein can be sold in any suitable venue. Such venues include but are not limited to internet, grocery stores, supermarkets, discounters, mass marketers (e.g., Target, Wal-Mart), membership warehouses (e.g., Costco, Sam's Club), military outlets, drug stores, restaurants, fast food restaurants, delis, markets, butcher shops, health food stores, organic food stores, private caterers, commercial caterers, food trucks, restaurant chains, kiosks, street carts, street vendors, cafeterias (e.g., school cafeterias, hospital cafeterias), and the like.

All references, including publications, patent applications, and patents, cited herein are hereby incorporated by reference to the same extent as if each reference were individually and specifically indicated to be incorporated by reference and/or were set forth in its entirety herein.

EXAMPLES

The following examples are included to demonstrate preferred embodiments of the invention. It should be appreciated by those of skill in the art that the techniques disclosed in the examples that follow represent techniques discovered by the inventors to function well in the practice of the invention. However, those of skill in the art should, in light of the present disclosure, appreciate that many changes can be made in the specific embodiments that are disclosed and still obtain a like or similar result without departing from the spirit and scope of the invention, therefore all matter set forth or shown in the accompanying drawings is to be interpreted as illustrative and not in a limiting sense.

Example 1

Meat Structured Protein Products Comprising Cell Wall Material may be Produced by Thermoplastic Extrusion as Follows A dry mix of composition 95.4% by weight pea protein isolate (F85M; obtained from Roquette, Inc., Lestrem, France; comprising about 80% by weight of protein, about 6% by weight of lipid, about 3% by weight of carbohydrate (about 1% by weight of dietary fiber), about 4% by weight of ash, and about 7% by weight of water), 2% by weight of gypsum (Calcium Sulfate, Dihydrate, Terra Alba; obtained from CGC, Inc. Chicago, Ill.; comprising about 80.0% by weight of ash (23,000 mg calcium/100 g) and about 20% by weight of water), and 2.6% by weight of beef flavor (NO-280-952-1; obtained from Givaudan, Vernier, Switzerland; comprising about 26.0% by weight of protein, about 4% by weight of lipid, about 36% by weight of carbohydrates (about 1% by weight of edible fiber), about 8.3% by weight of ash (8,300 mg sodium/100 g), and about 25.7% by weight of water) is blended for 5 minutes in a ribbon blender.

The dry ingredient blend is transferred to the hopper of a gravimetric feeder that meters the blend through the feed port of a twin screw extruder (MPF 50/25 Co-rotating Twin-Screw Extruder (APV Baker, Grand Rapids, Mich.)) at a rate of 27.1 kg/h. At the same time, water is channeled from a water tank through an in-line water heater that keeps the water temperature fixed at 21.1° C., and is pumped via a gear pump through the liquid feed port of the twin screw extruder (located 100 mm downstream of the dry mix feed port) at 21.7 kg/h. A yeast slurry (Springcell Oenologie, Fementis, Marcq en Baroeul, France; 8.75 g of dry cell wall material dissolved with water in a total volume of 100 mL) is pumped via a gear pump at a rate of 20 kg/h through an additional liquid feed port located 330 mm downstream of the dry mix feed port.

The twin screw extruder mixes the dry ingredient blend with the water and the yeast slurry to generate a dough comprising about 31% by weight of protein, about 1.9% by weight of carbohydrate about 0.4% by weight of edible fiber), about 2.5% by of lipid, about 2.3% by weight of ash, and about 60% by weight of water, with a cell wall material content of about 2.5%.

Extrusion parameters are as shown in Table 1.

TABLE 1

| Extrusion Parameters | |
|---|---|
| Screw Profile Assembly | Zones 1-3: conveying screw elements; Zones 4,5: mixing screw elements; Zones 6-8: medium shear screws; Zone 9: final mixing screws. |
| Extruder Barrel | 10 zones, each individually controlled via an electric heater cartridge (4 × 900 W per zone) and a cooling water jacket (supplied with building water, 60° F.); overall barrel length = 1,250 mm; length of each zone = 125 mm. |
| Barrel Heater Set Points | Zones 1-4: 30-35° C.; Zones 5-7: 55-91° C.; Zones 8-10: 111-125° C. |
| Extrusion Screws | Co-rotating in counter-clockwise direction at 200 revolutions per minute. |

Protein fibrous product emerges from the extruder as short, somewhat irregular, strands of crumbles. The crumbles are allowed to cool on a pan for 5 minutes. The composition of the protein fibrous product is about 31% by weight of protein, about 1.9% by weight of carbohydrate about 0.4% by weight of edible fiber), about 2.5% by of lipid, about 2.3% by weight of ash, and about 60% by weight of water, with a cell wall material content of about 2.5%.

Hydrated protein fibrous product is obtained by mixing the protein fibrous product with an equal part by weight of 212° F. warm water and simmering in a covered vessel for 15 minutes (stirred every 3 minutes).

Example 2

Yeast Cell Wall Material Content of Meat Structured Protein Products may be Analyzed By Histology As Follows The meat structured protein product is solubilized in urea and dilutions of the treated material are stained with calcofluor white (Sigma-Aldrich Chemie GmbH, Switzerland), a non-specific fluorochrome that binds to cellulose and chitin in cell walls. The stained product is examined by microscopy under UV light at 100× to 400× magnification. Yeast cell wall material is counted using a hemocytometer, and the percentage cell walls by weight of the meat structured protein product is calculated as follows: (number of intact cell walls x urea reaction dilution factor×dry weight of haploid yeast cell wall (3.5 pg)×100)/weight of solubilized meat structured protein product in grams. The method can be adapted to determine the content of cell wall materials derived from other natural sources by using the dry weight of such cells in the formula.

What is claimed is:

1. A meat structured protein product, comprising:
    a dough intermediate product having at least about 0.01% by weight of an extracted cell wall material;
    a non-native bound compound non-covalently bound to the extracted cell wall material and configured to impart an animal meat-like property to the meat structured protein product;
    protein fibers that form a three-dimensional protein network; and
    at least about 5.0% by weight of a non-animal protein material.

2. A meat structured protein product of claim 1 wherein the meat structured protein product comprises from about 0.01% to about 10% by weight of the extracted cell wall material.

3. A meat structured protein product of claim 2 wherein the meat structured protein product comprises from about 1.0% to about 5.0% by weight of the extracted cell wall material.

4. A meat structured protein product of claim 2 wherein the meat structured protein product comprises from about 0.01% to about 0.1% by weight of the extracted cell wall material.

5. A meat structured protein product of claim 1 wherein the extracted cell wall material is yeast cell wall material.

6. A meat structured protein product of claim 5 wherein the meat structured protein product comprises from about 0.01% to about 10.0% by weight of yeast cell wall material.

7. A meat structured protein product of claim 5 wherein the meat structured protein product comprises from about 0.01% to about 0.1% by weight of yeast cell wall material.

8. A meat structured protein product of claim 5 wherein the meat structured protein product comprises from about 0.1% to about 1.0% by weight of yeast cell wall material.

9. A meat structured protein product of claim 5 wherein the meat structured protein product comprises from about 0.01% to about 1.0% by weight of yeast cell wall material.

10. A meat structured protein product of claim 1 wherein the meat structured protein product comprises at least about 0.001%, at least about 0.01%, or at least about 0.1% by weight of a polysaccharide found in a cell wall.

11. A meat structured protein product of claim 10 wherein the cell wall is yeast cell wall.

12. A meat structured protein product of claim 10 wherein the polysaccharide is native to a plant.

13. A meat structured protein product of claim 12 wherein the polysaccharide native to a plant is selected from the group consisting of cellulose, xyloglucan, and pectin.

14. A meat structured protein product of claim 10 wherein the polysaccharide is native to an algae.

15. A meat structured protein product of claim 14 wherein the polysaccharide native to an algae is selected from the group consisting of cellulose, mannans, xylans, alginic acid, sulfonate polysaccharides, agarose, carrageenan, porphyrin, furcellaran, and funoran.

16. A meat structured protein product of claim 10 wherein the polysaccharide is native to a fungus.

17. A meat structured protein product of claim 16 wherein the polysaccharide native to a fungus is selected from the group consisting of mannan, chitin, alpha-glucans, and beta-glucans.

18. A meat structured protein product of claim 10 wherein the polylsaccharide is native to a bacterium.

19. A meat structured protein product of claim 18 wherein the polysaccharide native to a bacterium is bacterial murein.

20. A meat structured protein product of claim 1 wherein the extracted cell wall material comprises at least about 0.001% by weight of a compound other than polysaccharide found in a cell wall.

21. A meat structured protein product of claim 20 wherein the compound other than polysaccharide found in a cell wall is a glycoprotein.

22. A meat structured protein product of claim 20 wherein the compound other than polysaccharide found in a cell wall is orthosilicic acid.

23. A meat structured protein product of claim 1 wherein the extracted cell wall material comprises intact cell walls.

24. A meat structured protein product of claim 1 wherein the non-native bound compound is selected from the group consisting of flavoring agents, coloring agents, browning agents, pigments, binding agents, volatile compounds, salts, fats, lipids, oils, gums, natural or synthetic polymers, starches, pectins, tannins, vitamins, thermolabile compounds, redox intolerant compounds, acid/base intolerant agents, buffers, pH adjusting agents, micronutrients, essential nutrients, stabilizing agents, crosslinking agents, hygroscopic agents, surfactants, diatomaceous earth, plant extracts, microbial extracts, antibacterials, antifungals, and textural agents.

25. A meat structured protein product of claim 1 wherein the animal meat-like property is at least one of flavor, color, color transition during cooking, odor, mouthfeel, texture, structure, nutritional value, freshness, sizzle sound during cooking, melted fat release during cooking, shelf life, digestibility, moisture, enzymatic activity, and nutrient stability.

26. A meat structured protein product of claim 1 wherein the animal meat-like property is imparted when the non-native bound compound is non-covalently bound to the extracted cell wall material.

27. A meat structured protein product of claim 1 wherein the animal meat-like property is imparted upon release of the non-native bound compound from the extracted cell wall material.

28. A meat structured protein product of claim 27 wherein release of the non-native bound compound from the extracted cell wall material occurs under a trigger condition selected from the group consisting of temperature, oxygenation, UV irradiation, pH, salt concentration, nutrient concentration, passage of time, mechanical force, pressure, and sound energy.

29. A meat structured protein product of claim 27 wherein the non-native bound compound is a flavoring agent that is released under a trigger condition selected from the group consisting of biting and cooking of the meat structured protein product.

30. A meat structured protein product of claim 1 wherein the extracted cell wall material is further encapsulated in a lipid to slow release of the bound compound.

31. A meat structured protein product of claim 1 wherein the non-animal protein material is between about 20% and about 60% by weight of the meat structured protein product.

32. A meat structured protein product of claim 1 wherein the non-animal protein material comprises pea protein.

33. A meat structured protein product of claim 1 which further comprises between about 1% and about 10% by weight of a lipid material.

34. A meat structured protein product of claim 33 which comprises between about 2% and about 4% by weight of a lipid material.

35. A meat structured protein product of claim 1 which further comprises between about 1% and about 20% by weight of carbohydrate material.

36. A meat structured protein product of claim 35 which comprises between about 5% and about 15% by weight of carbohydrate material.

37. A meat structured protein product of claim 1 which further comprises between about 0.1% and about 5% by weight of edible fiber.

38. A meat structured protein product of claim 1 which has a moisture content of at least about 30%.

39. A meat structured protein product of claim 38 which has a moisture content of between about 40% and about 60%.

40. A meat structured protein product of claim 1 wherein the non-native bound compound is prevented from reaction with other compounds during production of the meat structured protein product or in the meat structured protein product.

41. A meat structured protein product, comprising:
  a dough intermediate product having at least about 0.01% by weight of an extracted cell wall material, wherein the extracted cell wall material comprises intact cell walls;
  protein fibers that form a three-dimensional protein network; and
  at least about 5.0% by weight of a non-animal protein material.

42. A meat structured protein product of claim 41 wherein the extracted cell wall material comprises a non-native compound that is non-covalently bound to the extracted cell wall material after extraction of the extracted cell wall material.

43. A meat structured protein product of claim 42 wherein the non-native compound is configured to impart a meat-like property to the meat structured protein product.

* * * * *